(12) United States Patent
Tanaka et al.

(10) Patent No.: US 7,349,204 B2
(45) Date of Patent: Mar. 25, 2008

(54) DISK DEVICE

(75) Inventors: Katsuya Tanaka, Kokubunji (JP);
Tetsuya Shirogane, Yokohama (JP);
Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 11/119,848

(22) Filed: May 3, 2005

(65) Prior Publication Data

US 2006/0187634 A1    Aug. 24, 2006

(30) Foreign Application Priority Data

Feb. 22, 2005  (JP)  ............................. 2005-045365

(51) Int. Cl.
*H05K 7/20*  (2006.01)
*H05K 7/00*  (2006.01)
*H05K 7/16*  (2006.01)
*H05K 5/00*  (2006.01)
*G06F 1/16*  (2006.01)
*G06F 1/20*  (2006.01)

(52) U.S. Cl. ...................... 361/685; 361/684; 361/687; 361/727

(58) Field of Classification Search ........ 361/684–687, 361/724, 725, 727
See application file for complete search history.

(56) References Cited

U.S. PATENT DOCUMENTS

| | | | | |
|---|---|---|---|---|
| 5,506,750 | A | * | 4/1996 | Carteau et al. ............. 361/685 |
| 6,392,884 | B1 | * | 5/2002 | Chou .......................... 361/687 |
| 6,510,050 | B1 | * | 1/2003 | Lee et al. .................... 361/685 |
| 6,665,179 | B2 | * | 12/2003 | Chou .......................... 361/687 |
| 7,200,008 | B1 | * | 4/2007 | Bhugra ....................... 361/724 |
| 2006/0061955 | A1 | * | 3/2006 | Imblum ...................... 361/685 |
| 2007/0091559 | A1 | * | 4/2007 | Malone ....................... 361/685 |

FOREIGN PATENT DOCUMENTS

| | | |
|---|---|---|
| JP | 07-006004 | 1/1995 |
| JP | 08/137631 | 5/1996 |

* cited by examiner

*Primary Examiner*—Lisa Lea-Edmonds
*Assistant Examiner*—Anthony M Haughton
(74) *Attorney, Agent, or Firm*—Antonelli, Terry, Stout & Kraus, LLP.

(57) ABSTRACT

A disk device has a chassis, disk drives, wiring boards for the disk drives and blowers for cooling the disk drives. The disk drives are arranged in height and depth directions in the chassis. The disk drives are spaced each other with a predetermined distance and attached to the wiring boards so that a disk surface of rotation of each disk drive is perpendicular to a board surface of a wiring board. The disk device further includes drawer units which provide simultaneous extraction of the disk drives, the wiring boards and the blowers from the chassis.

19 Claims, 20 Drawing Sheets

DISK DEVICE

BACKGROUND OF THE INVENTION

The present invention relates to a disk device and, in particular, a disk device which is equipped with a plurality of disk drives.

A high performance computer system generally has a host system such as CPU and a secondary storage device such as a magnetic disk. The host system reads necessary data out of the secondary storage device whenever need arises and writes the data thereinto. In addition to the magnetic disk, the secondary storage device includes a disk device having a nonvolatile storage medium, which is randomly accessible, such as an optical disk.

There has recently been a trend that the storage capacity of a disk device is increasing, which is equipped with a large number of small disk drives (hereinafter simply referred to as "drives"), and the demand for further upgrading, miniaturization as well as an increase in the storage capacity, is developing into a pressing necessity. Namely, a demand for high packaging density is increasing. In response to this demand, a disk device has been adopted which has plural drives three-dimensionally arranged in a chassis. More specifically speaking, columns of drives, in which drives are arranged in a depth (Y) direction in a chassis, are arranged in height (Z) and width (X) directions.

However, when failure occurs in a drive installed in this disk device, it will be necessary to carry out replacement of a failed drive with a normal drive. In order to make preparations for such an occasion, the disk device generally has a space between neighboring columns of drives. This will create limitation on seeking for better packaging density of drives. Disk devices for which replacement of drives can be carried out outside a chassis have been proposed recently. For example, Japanese Published Patent Application 08-137631, paragraphs 0011 to 0022 and FIG. 1, and Japanese Published Patent Application 07-6004, paragraphs 0019 to 0033 and FIG. 4, disclose related arts.

In a disk device disclosed in JP08-137631, plural slots, each of which has two drives in depth (Y) and height (Z) directions, respectively, are arranged in a height (Z) direction. These slots are adapted to be drawn out from a chassis of the disk device. When failure occurs in a drive installed in the disk device, typical repair is done in the following manner by an operator: drawing out a slot including the failed drive, replacing the failed drive with a normal one outside a chassis and restoring the slot to an original position in the chassis. It is assumed that other normal disks of this disk device may continue to work while the slot is drawn out from the chassis.

On the other hand, a disk device disclosed in JP07-6004, two columns of drives, each of which has five or six drives in a depth (Y) direction, are arranged in a width (X) direction. Furthermore, the disk device has plural panels in its height (Z) direction, which have an electronic card (adapter device). These plates are adapted to be drawn out from a chassis of the disk device. In the case of failure of a drive installed in the disk device, it is possible to conduct replacement of drives outside the chassis.

However, the disk device disclosed in JP 08-137631 has a drawback that when the slot is drawn out, efficiency of cooling provided by a fan decreases due to an undesirably long distance between drives and the fan. Furthermore, ambient air flows into the slot through an opening of the chassis for drawing out the slot, thereby disturbing the flow of cooling air. This means that this disk device is not able to provide sufficient cooling for drives while the slot is drawn out. As this disk device has no provision for packaging plural drives in a width (X) direction, it is difficult to increase its capacity of storage.

The disk device disclosed in JP07-6004, in which not only two columns of drives are spaced by the width of a board of electronic card (adapter device), but also its board surface and a surface of rotation for a drive are positioned parallel to each other, inevitably has a low packaging density in a width (X) direction.

SUMMARY OF THE INVENTION

The present invention seeks to solve the problems described above and provide a disk device which is able to realize a high packaging density of drives.

In addition, the present invention seeks to provide a disk device which is able to cool drives in operation during replacement of drives.

It is an aspect of the present invention to provide a disk device, which comprises a chassis, disk drives, wiring boards for the disk drives and blowers for cooling the disk drives. The disk drives are arranged in height and depth directions in the chassis. The disk drives are spaced each other with a predetermined distance and attached to the wiring boards so that a disk surface of rotation of each disk drive is perpendicular to a board surface of a wiring board. The disk device further comprises drawer units which provide simultaneous extraction of the disk drives, the wiring boards and the blowers from the chassis.

Because the disk device described above allows simultaneously drawing out the disk drives, the wiring boards and the blowers, it is possible to provide sufficient cooling for normal drives and wiring boards in parallel to replacement of failed drives. Also, because the disk drives are attached to the wiring boards so that a disk surface of rotation of each disk drive is perpendicular to a board surface of a wiring board, it is possible to increase packaging density of drives.

It may be preferable but not necessary that a disk device comprises a chassis, columns of drives each having disk drives which are arranged in a depth direction in the chassis and wiring boards for the columns of disk drives. The columns of drives are spaced each other in height and width directions in the chassis with predetermined distances. Each wiring board is disposed between two columns of drives neighboring each other in the width direction so that a disk surface of rotation of each disk drive is perpendicular to a board surface of a wiring board, and both surfaces of the wiring board have each a connection surface for disk drive. The disk device further comprises drawer units each providing simultaneous extraction of the wiring board and at least the two columns of drives from the chassis. As the volume of a space required for the drawer units can be decreased compared with a disk drive in which only one column of drives is drawn out by a drawer unit, it is possible to increase packaging density of drives.

It may be possible but not necessary that a disk device comprises a chassis, columns of drives each having disk drives which are arranged in a depth direction in the chassis, wiring boards for the columns of disk drives and blowers for cooling the disk drives. The columns of drives are spaced each other in height and width directions in the chassis with predetermined distances. Each wiring board is disposed between two columns of drives neighboring each other in the width direction so that a disk surface of rotation of each disk drive is perpendicular to a board surface of a wiring board, and both surfaces of the wiring board have each a connection surface for disk drive. The disk device further comprises drawer units each providing simultaneous extraction of the wiring board, at least the two columns of drives and the blowers from the chassis.

DESCRIPTION OF THE PREFERRED EMBODIMENTS

Embodiments of the present invention will now be described in detail with reference to the accompanying drawings.

a. First Embodiment

Figure 1:
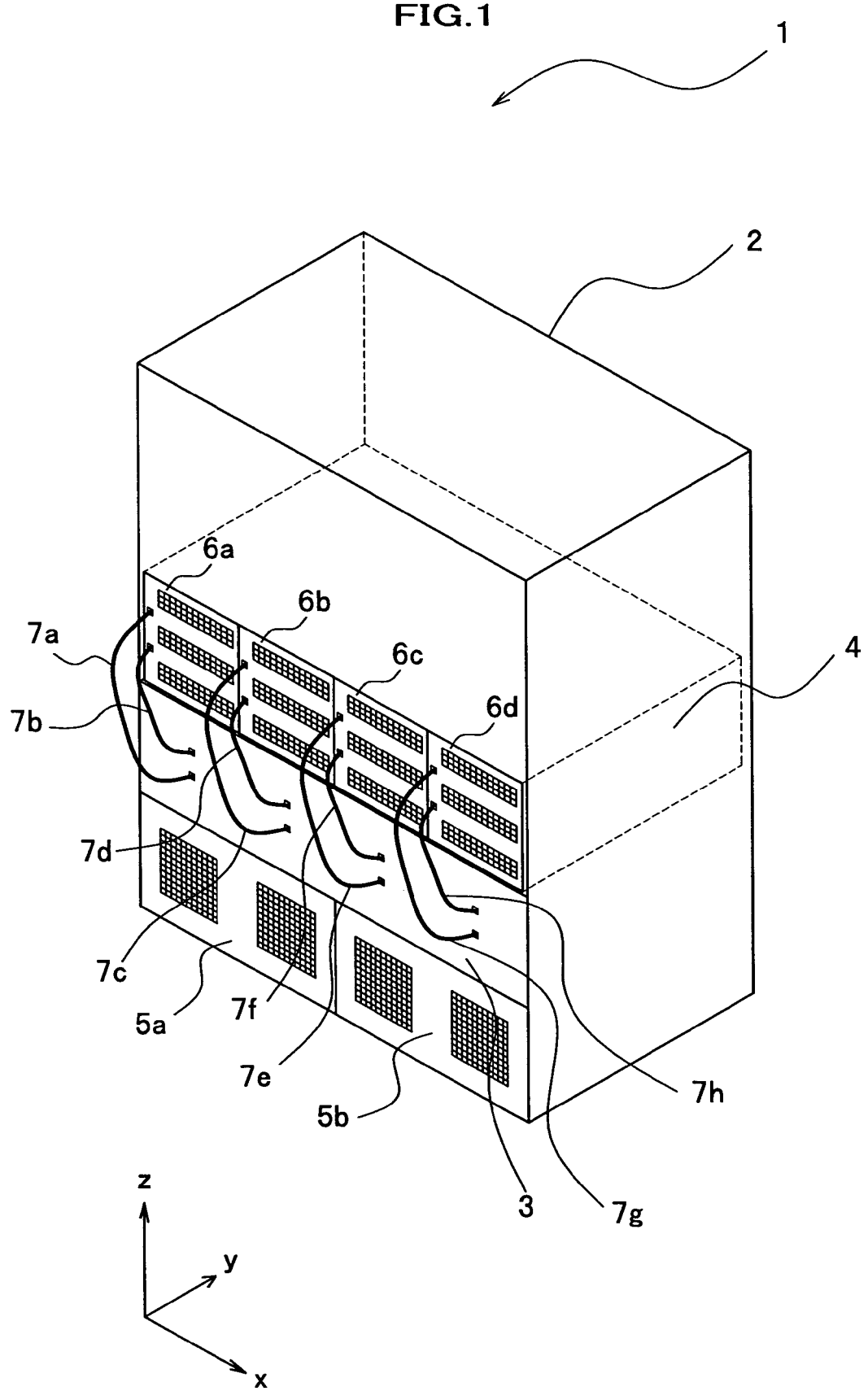
FIG. 1 is a front view illustrating a disk device according to the present invention.

As shown in FIG. 1, a disk device 1 includes a disk controller 3, a disk array unit 4 and two power supplies 5a and 5b in a chassis 2. X, Y and Z denote directions relative to a width, depth and height of the chassis 2, respectively. The chassis 2 is, for example, a 19 inch rack and the like.

The disk controller 3 to be described later controls the disk array unit 4.

The disk array unit 4, which is upwardly disposed next to the disk controller 3 in Z direction, has four drawers (drawer units) 6a, 6b, 6c and 6d in X direction. Each of these drawers 6a, 6b, 6c and 6d can be drawn out in −Y direction. A drawer 6a is electrically connected to the disk controller 3 via channels 7a and 7b. Similarly, the drawers 6b, 6c and 6d are electrically connected to the disk controller 3 via channels 7c and 7d, channels 7e and 7f and channels 7g and 7h, respectively. Each of the channels 7a to 7h has sufficient extra length so that each of the drawers 6a to 6d can be smoothly drawn out.

Figure 2:
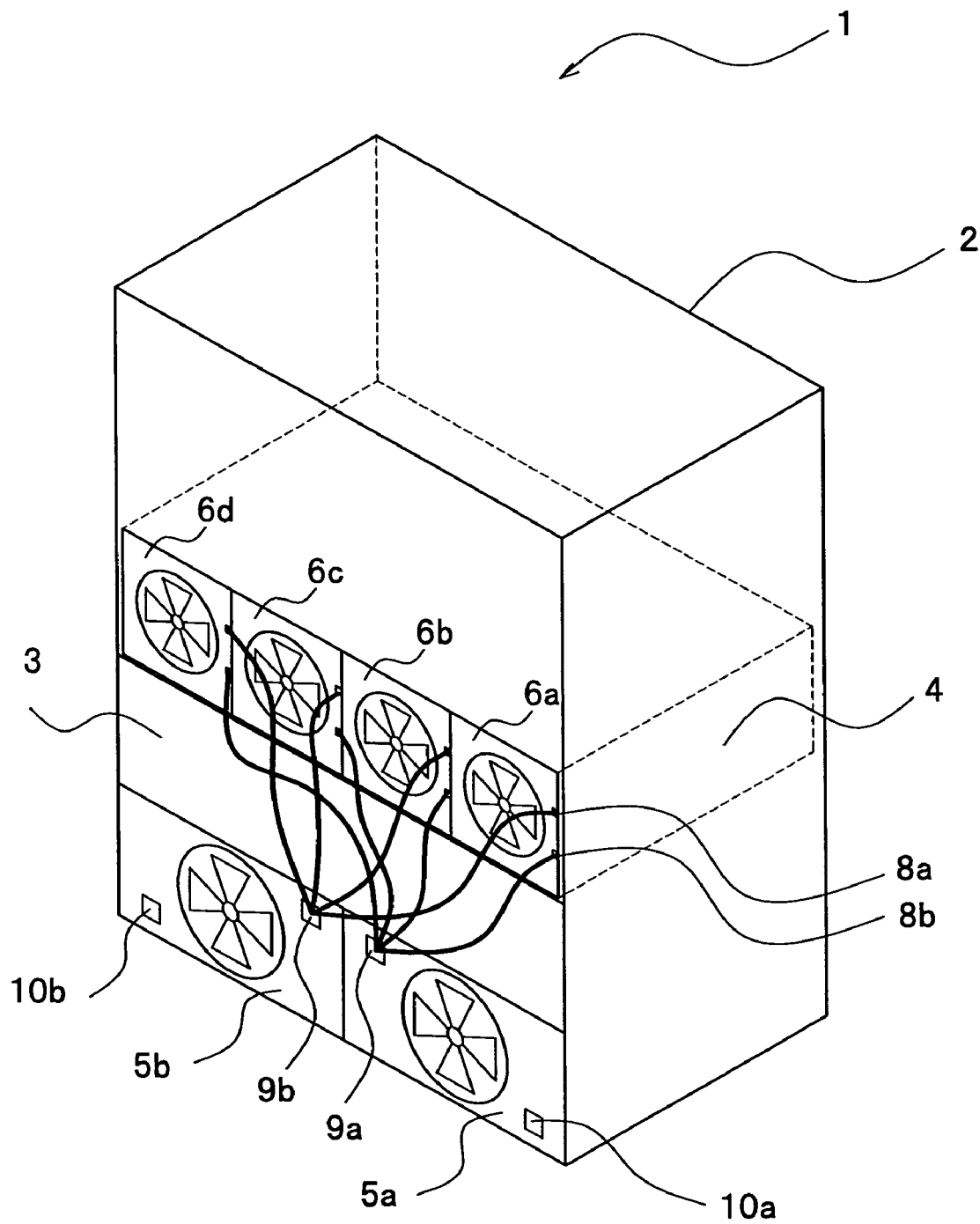
FIG. 2 is a rear view illustrating a disk device according to the present invention.

The power supplies 5a and 5b are disposed side by side in X direction and downwardly next to the disk controller 3 in Z direction. As shown in FIG. 2, each of the power suppliers 5a and 5b is electrically connected to the drawers 6a to 6d via plural power cables. These power cables also have sufficient extra length so that the drawers 6a to 6d are drawn out without their adverse effect. In this way, electric power is supplied to each of the drawers 6a to 6d by one of the power suppliers 5a and 5b. More specifically speaking, a connector 8a of the drawer 6a is electrically connected to a connector 9b of the power supply 5b and at the same time a connector 8b of the drawer 6a is electrically connected to a connector 9a of the power supply 5a. This arrangement enables reliable power supply to the drawer 6a from one of the power supplies 5a and 5b. In this connection, one of these power supplies which does not supply electric power serves as a backup. It may be alternatively possible that both power supplies 5a and 5b supply electric power to the drawer 6a and a selection is made for individual disk drives, which will be described later. The power supplies 5a and 5b are electrically connected to a main power supply via power connectors 10a and 10b.

Figure 3:
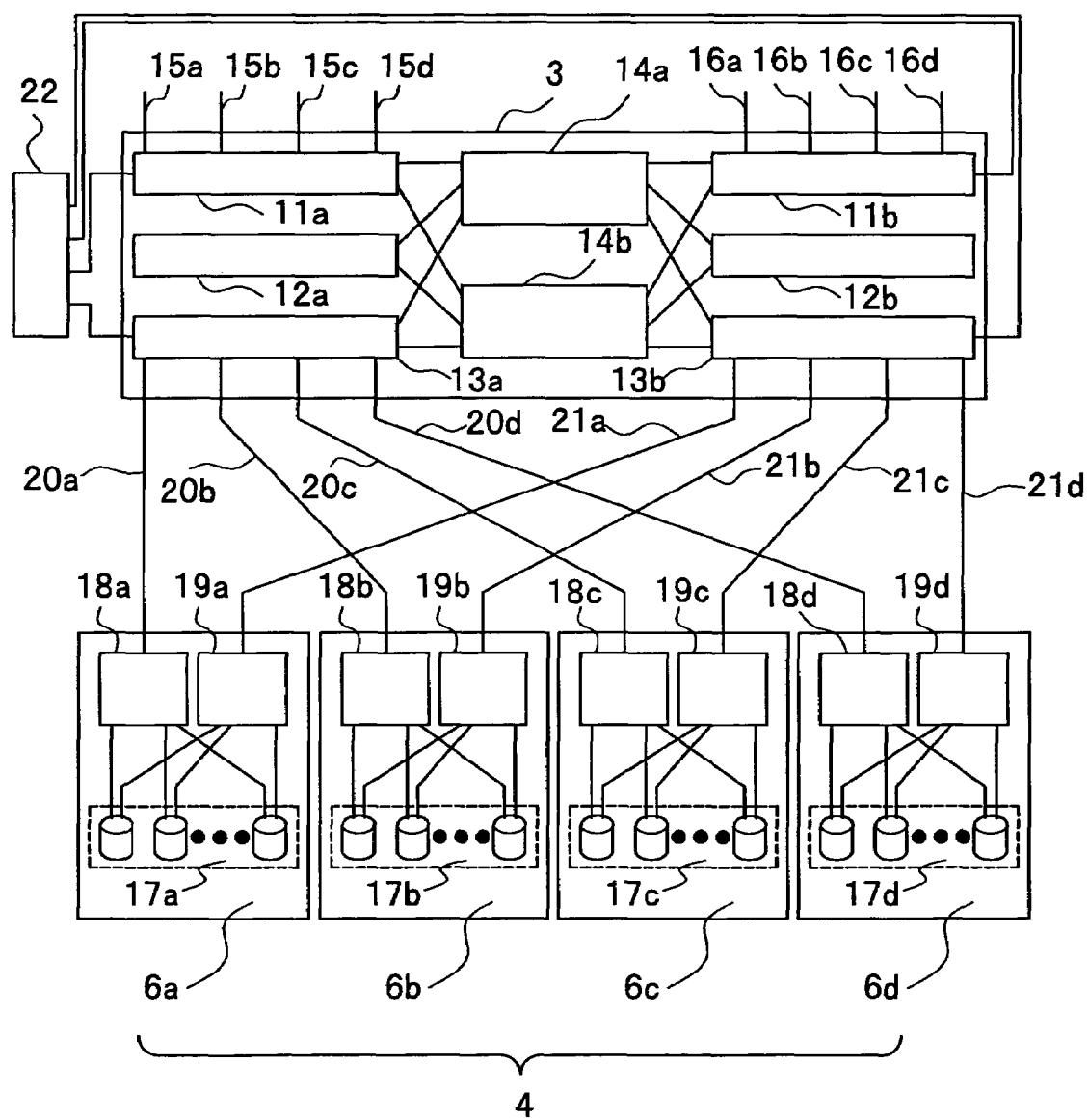
FIG. 3 is a block diagram showing a disk controller and disk array unit.

As shown in FIG. 3, the disk controller 3 has channel adapters 11a and 11b, cache memories 12a and 12b and disk adapters 13a and 13b.

The cache memories 12a and 12b are used for temporarily storing data.

Detailed structure of the channel adapters 11a and 11b and that of the disk adapters 13a and 13b will be described later.

A channel adapter 11a, a cache memory 12a and a disk adapter 13a are electrically connected to interconnection networks 14a and 14b. Also, the channel adapter 11a is connected to a host system such as CPU (not shown) via channels 15a, 15b, 15c and 15d.

Similarly, a channel adapter 11b, a cache memory 12b and a disk adapter 13b are electrically connected to the interconnection networks 14a and 14b. Also, the channel 11b is connected to a host system (not shown) via channels 16a, 16b, 16c and 16d.

Description is now given of principal structure of the disk array unit 4, which is electrically connected to the disk controller 3. The drawer 6a, which is a part of the disk array unit 4, has a disk array 17a including plural disk drives (hereinafter referred to as "drives") and switches 18a and 19a, which conduct switching of these drives so as to connect them to two input/output ports. A drive belonging to the disk array 17 is a drive having two input/output ports such as a drive of Fibre Channel standard and Serial Attached SCSI (SAS) standard. Similarly, the drawer 6b has a disk array 17b and switches 18b and 19b, the drawer 6c has a disk array 17c and switches 18c and 19c and the drawer 6d has a disk array 17d and switches 18d and 19d.

In this connection, when a drive of Serial ATA (SATA) standard having one input/output port is used for each drive, it may be possible to set up a disk array unit 4 shown in FIG. 3 by connecting a port selector for each drive so as to configure a two-port drive. In this case, it may be possible to use port multipliers for the switches 18a to 18d and 19a to 19d. Also, when drives of SAS standard are used to set up a disk array unit 4, it may be possible to use expanders for the switches 18a to 18d and 19a to 19d. Furthermore, when dual loop connection with Fibre Channel Arbitrated Loops (FC-AL) is used to set up a disk array 4, it may be possible to use loop switches for the switches 18a to 18d and 19a to 19d.

Description is given of electrical connection between the disk array unit 4 and the disk controller 3 described above. The disk adapter 13a of the disk controller 3 is electrically connected to the disk array 17a via a disk channel 20a and the switch 18a. The disk adapter 13a is electrically connected to the disk array 17b via a disk channel 20b and the switch 18b. The disk adapter 13a is also electrically connected to the disk array 17c via a disk channel 20c and the switch 18c. In addition, the disk adapter 13a is electrically connected to the disk array 17d via a disk channel 20d and the switch 18d.

Similarly, the disk adapter 13b is electrically connected to the disk array 17a via a disk channel 21a and the switch 19a. The disk adapter 13b is electrically connected to the disk array 17b via a disk channel 21b and the switch 19b. The disk adapter 13b is also electrically connected to the disk array 17c via a disk channel 21c and the switch 19c. In addition, the disk adapter 13b is electrically connected to the disk array 17d via a disk channel 21d and the switch 19d.

The channel adapters 11a and 11b and the disk adapters 13a and 13b are electrically connected to a service processor 22. The service processor 22 has functionalities such as entering information into the disk controller 3 and monitoring operation of the disk device 1.

Figure 4:
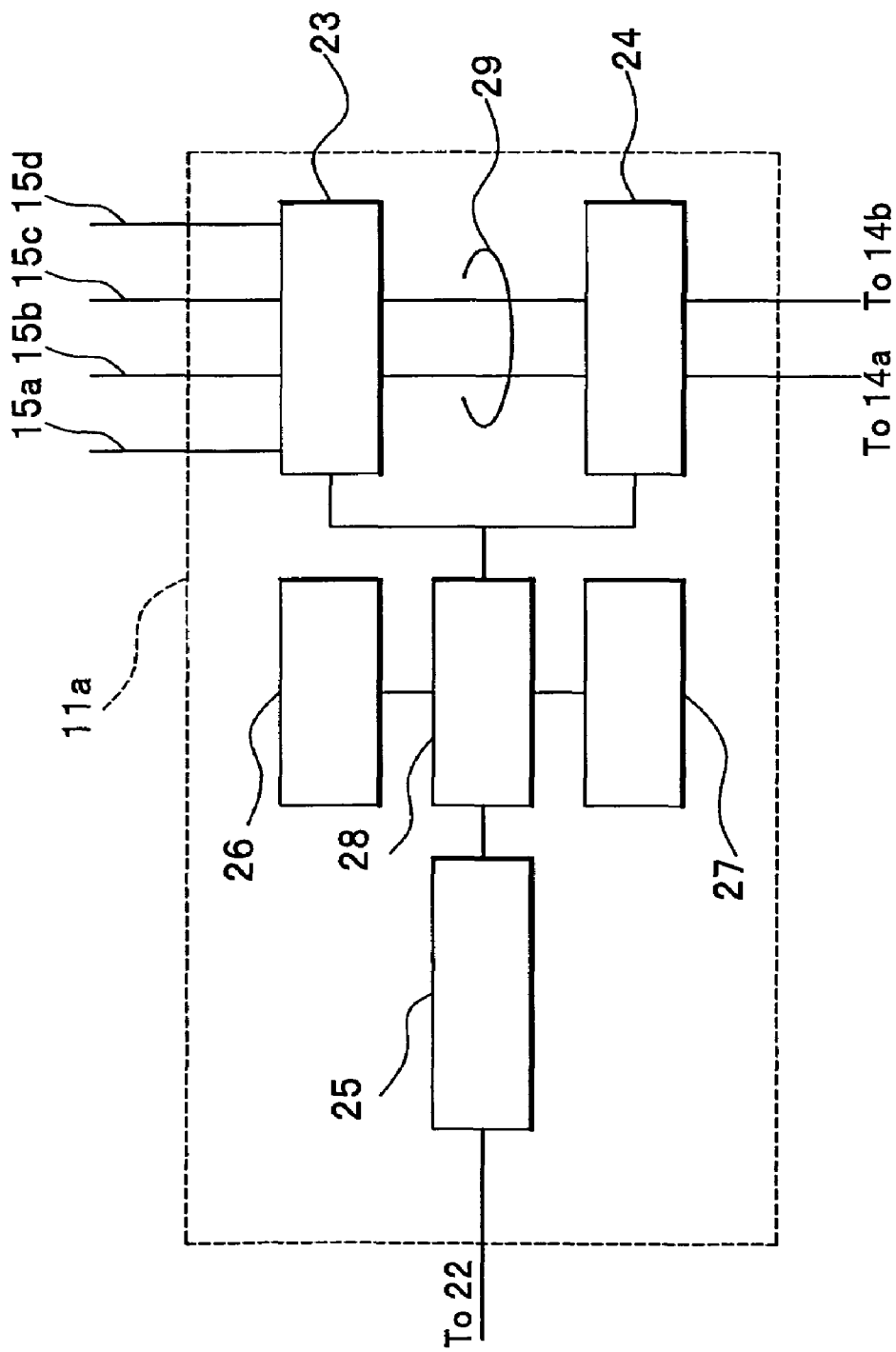
FIG. 4 is a block diagram illustrating a channel adapter.

As shown in FIG. 4, the channel adapter 11a includes a host channel interface 23, a cache memory interface 24, a network interface 25, a processor 26, a local memory 27 and a processor peripheral control unit 28.

The host channel interface 23 provides an interface for connecting the channel adapter 11a to the channels 15a to 15d. This host channel interface 23 conducts transformation between the data transfer protocol on the channels 15a to 15d and that of the disk controller 3.

The cache memory interface 24 provides an interface for connecting the channel adapter 11a to the interconnection networks 14a and 14b. Signal lines 29 electrically connect the cache memory interface 24 and the host channel interface 23.

The network interface 25 provides an interface for connecting the channel adapter 11a to the service processor 22.

The processor 26 controls data transfer between a host system (not shown) and the cache memory 12a.

The local memory 27 stores tables to which the processor 26 makes access and software which the processor 26 is required to execute. In this connection, setting and updating of the tables is carried out through the service processor 22.

The processor peripheral control unit 28 provides electrical connection among the host channel interface 23, the cache memory interface 24, the network interface 25, the processor 26 and the local memory 27.

On the other hand, in the case of the channel adapter 11b, the host channel interface 23 is electrically connected to the channels 16a to 16d, which is a single difference from the channel adapter 11a shown in FIG. 4. As the channel adapters 11a and 11b are the same except for this difference, description is not repeated.

Figure 5:
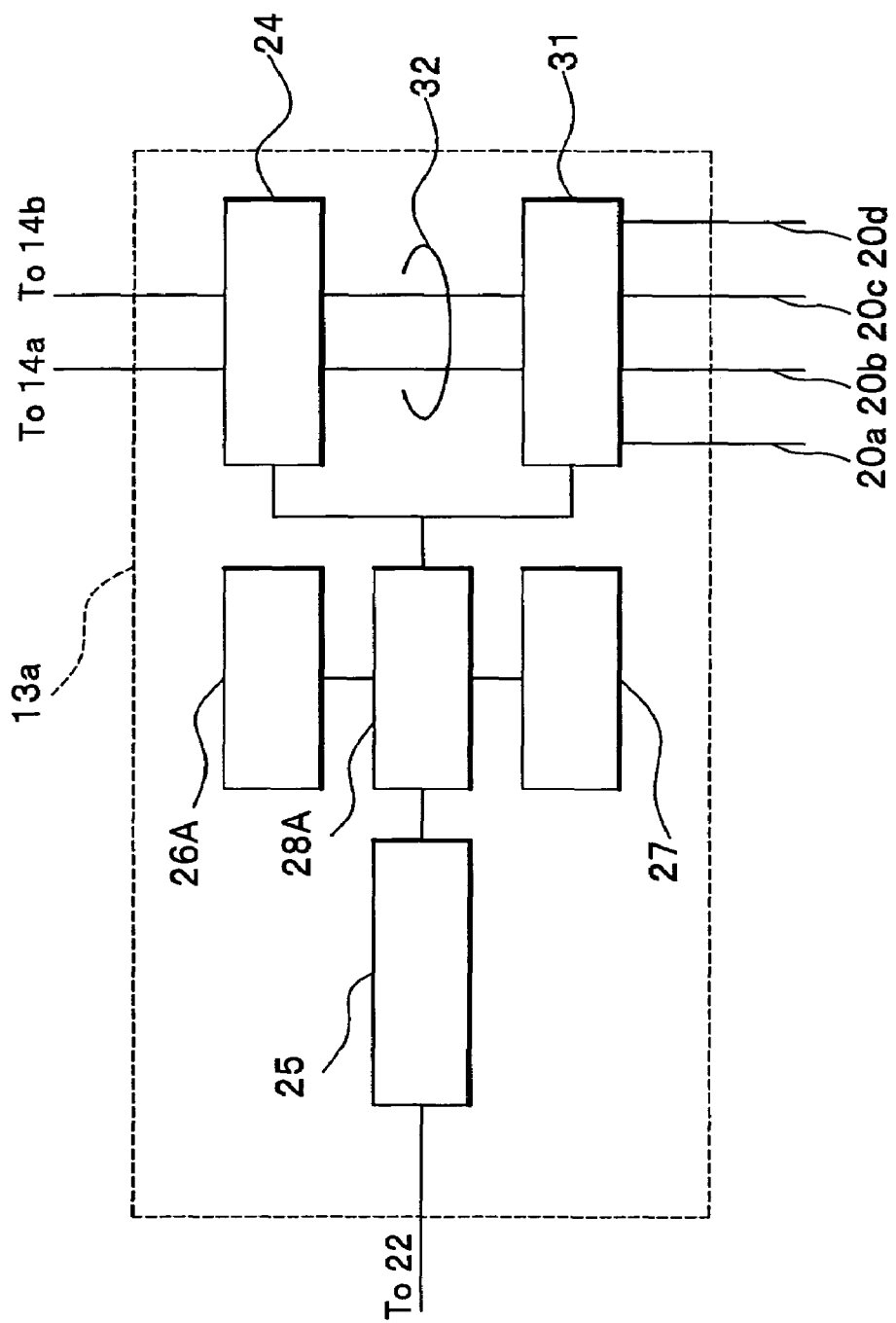
FIG. 5 is a block diagram illustrating a disk adapter.

As shown in FIG. 5, the disk adapter 13a includes a cache memory interface 24, a disk channel interface 31, a network interface 25, a processor 26A, a local memory 27 and a processor peripheral control unit 28A. As the configuration of disk adapter 13a is the same as that of the channel adapter 11a except for the processor 26A, the disk channel interface 31 and the processor peripheral control unit 28A, description is not repeated, giving same reference symbols for same elements.

The processor 26A controls data transfer between the cache memory 12a and the disk arrays 17a to 17d.

The disk channel interface 31 provides an interface for connecting the disk adapter 13a to the disk channels 20a to 20d. This disk channel interface 31 conducts transformation between data transfer protocol, for example FCP-SCSI, on the disk channels 20a to 20d and that of the disk controller 3. Signal lines 32 electrically connect the disk channel interface 31 and the cache memory interface 24.

The processor peripheral control unit 28A provides electrical connection among the cache memory interface 24, the disk channel interface 31, the network interface 25, the processor 26A and the local memory 27.

In the case of the disk adapter 13b, the disk channel interface 31 is electrically connected to the disk channels 21a to 21d, which is a single difference from the disk adapter 13a. As the disk adapter 13b is the same as the disk adapter 13a shown in FIG. 5 except for this difference, description is not repeated.

Though the above description has been given as an example that the disk controller 3 has the channel adapters 11a and 11b as well as the disk adapters 13a and 13b, it may be alternatively possible to select other configurations. For example, it may be possible to adopt one control unit which is able to replace not only the channel adapters 11a and 11b but also the disk adapters 13a and 13b. It may also be possible to provide an independent processor which replaces the processors 26 separated from the channel adapters 11a and 11b as well as the processors 26A separated from the disk adapters 13a and 13b. In this case this independent processor is electrically connected to the host channel interface 23, the cache memory interface 24, the network interface 25 and the disk channel interface 31 via a switch.

Figure 6:
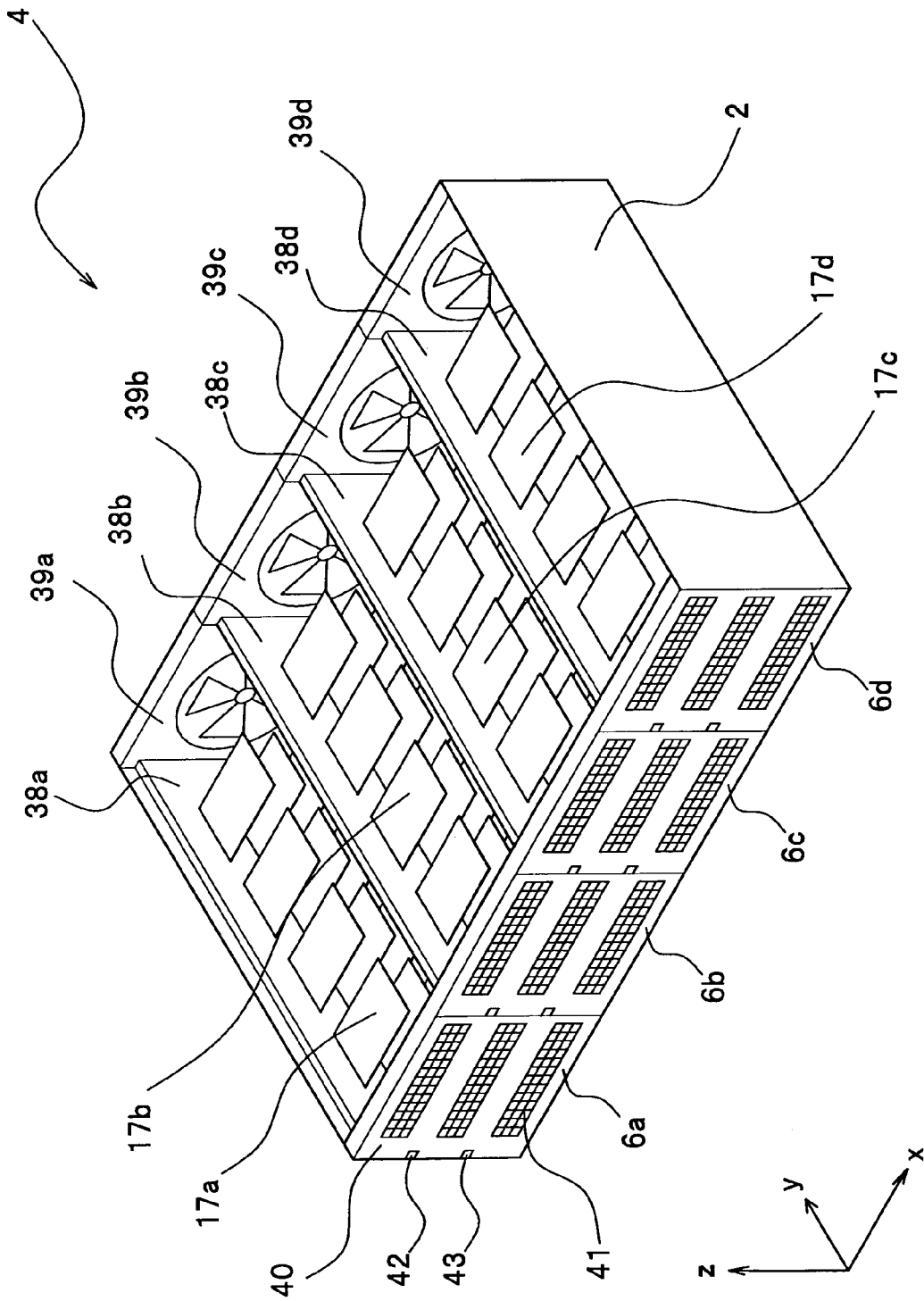
FIG. 6 is a perspective view illustrating the inside of a disk array unit.

Description is given of the structure of disk array unit 4 with reference to FIG. 6. The drawer 6a, a part of the disk array unit 4, has a wiring board 38a and a fan 39a in addition to the disk array 17a. Similarly, the drawer 6b has a wiring board 38b and a fan 39b in addition to the disk array. 17b. Also, the drawer 6c has a wiring board 38c and a fan 39c in addition to the disk array 17c. Furthermore, the drawer 6d has a wiring board 38d and a fan 39d in addition to the disk array 17d. Though not shown in FIG. 6, these drawers 6a to 6d each have a drawer frame and side and top panels which are attached to this drawer frame. Details will be described later.

Each of the disk arrays 17a to 17d has plural drives which are arranged in Y and Z directions in the chassis 2, spaced with predetermined distances. The drives are attached to the wiring boards 38a to 38d so that their disk surfaces of rotation are perpendicular to board surfaces of the wiring boards 38a to 38d. In the present embodiment, eight drives belonging to each of the disk arrays 17a to 17d are arranged in a disposition of four drives in Y direction and two tiers in Z direction while disk surfaces of rotation are in horizontal plane. In other words, each of the disk arrays 17a to 17d has two tiers of columns of drives in Z direction, each column including four drives in Y direction. The disk array unit 4 as a whole has four columns of drives in X direction.

In the drives belonging to the disk arrays 17a to 17d (drawers 6a to 6d), a data redundant configuration, namely a logical group of Redundant Array of Independent Disks (RAID), is established by making a combination of drives which belong to different drawers. For example, RAID1 is configured by making a combination of a drive belonging to the drawer 6a and a drive belonging to the drawer 6b. In the disk device 1, plural drives belonging to the drawer 6a are assigned for drives for storing data, and drives belonging to the drawer 6b are used as redundant drives (backup drives), which are counterparts of the drives for storing data. And the disk device 1 carries out parallel storing of data between the drives for storing data and the redundant drives. In this way, when a failure occurs in a drive for storing data, the disk device 1 makes access to a redundant drive and reads the same data (redundant information) as that stored in the drive for storing data.

RAID method adopted by the disk device 1 according to the present embodiment is not limited to RAID1 (level 1). It may be alternatively possible to adopt RAID5 (level 5). In this case, RAID5 is configured by making combination of drives belonging to the drawers 6a, 6b, 6c and 6d. A disk device of RAID5 (level 5) forms one logical group with N+1(N≧2) drives. When a host system requests writing of a data block, this disk device stores the data block in one of N+1 drives, and stores another data block in another drive in response to a subsequent request. This allows dispersive allocation of error correcting codes among N+1 drives forming a logical group. In this way, when a failure occurs in any one of the drives, the disk device of RAID5 is able to regenerate the data or error correcting code (for example parity data), which a failed drive stores, based on data read out of another drive belonging to the same logical group to which the failed drive belongs.

The wiring boards 38a to 38d are disposed so that a connection surface for drive (connection surface for disk drive) of each wiring board looks toward X direction in the chassis 2 (right direction in FIG. 6). As described later, the wiring boards 38a to 38d each have signal lines and power lines wired for the drives belonging to the disk arrays 17a to 17d. For example, the wiring board 38a has signal lines, power lines, switches 18a and 19a shown in FIG. 3 and other electronic parts, which are all implemented for the drives belonging to the disk array 17a.

The fans (blowers) 39a to 39d are disposed in rear panels of the drawers 6a to 6d. These fans 39a to 39d send air forward to backward in Y direction in the chassis 2 so as to cool the disk arrays 17a to 17d and the like. The drawers 6a to 6d each have a front panel 40. The front panel 40 has three ventilation openings with filters 41. Though not shown in FIG. 6, the front panel 40 has an array of light-emitting diodes (LED) so as to display the statuses of drives.

The wiring boards 38a to 38d each have connection ports which connect the disk arrays 17a to 17d and the disk controller 3. More specifically speaking, the wiring board 38a has connection ports 42 and 43 through which the disk array 17a and the disk controller 3 are connected by the channels 7a and 7b (see FIG. 1). These connection ports 42 and 43 are exposed in an end portion of the front panel 40 (extremely left side in FIG. 6).

Figure 7:
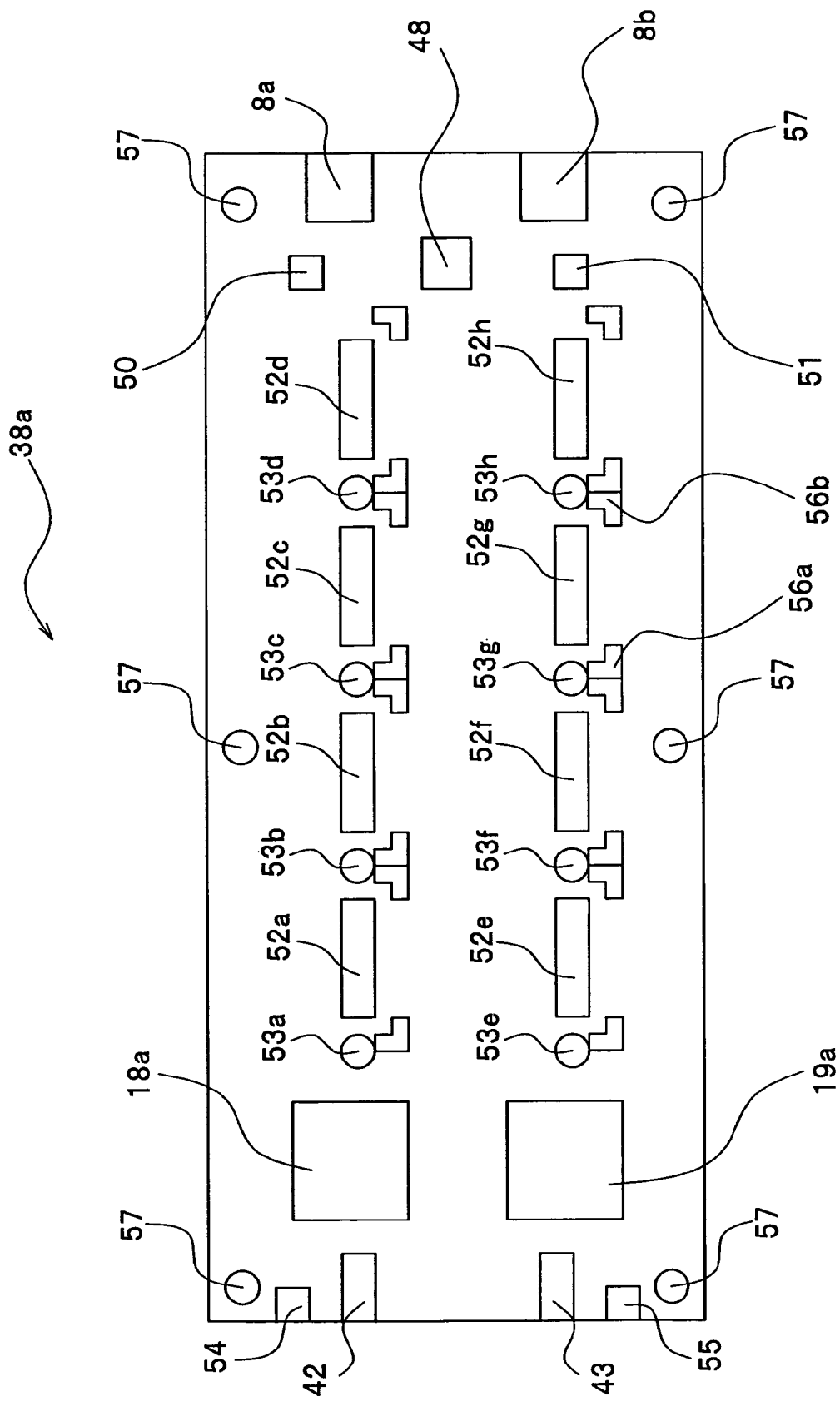
FIG. 7 is a schematic diagram illustrating a wiring board as seen from right side in X direction in FIG. 6.

Next, description is given of parts mounted on the wiring boards 38a to 38d with reference to FIG. 7. Description is given by selecting the wiring board 38a as an example. As shown in FIG. 7, the switches 18a and 19a, a power supply monitor 48, switches 50 and 51, receptacles 52a, 52b, 52c, 52d, 52e, 52f, 52g and 52h and light-emitting diodes 53a, 53b, 53c, 53d, 53e, 53f, 53g and 53h are mounted on the wiring board 38a.

The switch 18a provides not only switching between the drives of the disk array 17a (see FIG. 3) and the connection port 42, but also sending signals received from these drives as a result of monitoring their statuses to the connection port 42. The switch 18a provides switching of two lines for power supplies 5a and 5b (see FIG. 1), which will be described later. In this connection, the power supply 5a supplies electrical power for the wiring board 38a via the connector 8b, and the power supply 5b supplies electrical power for the wiring board 38a via the connector 8a.

The switch 19a controls input and output signals of the connection port 43, which is a single difference from the switch 18a. As the switch 19a works basically the same as the switch 18a except for this difference, description is not repeated.

The power supply monitor (switching control unit) 48 monitors two lines of the power supplies 5a and 5b and controls the switches 50 and 51, thereby providing normal power supply for the drives.

The switches 50 and 51 provides switching of electric power between the power supply 5b (see FIG. 1) connected to the connector 8a and the power supply 5a connected to the connector 8b.

The receptacles 52a to 52h, with which the drives belonging to the disk array 17a are mated, provides not only inputting and outputting of signals but also supplying of electric power. At both lower sides of each of the receptacles 52a to 52h, two cutouts for inserting a drive rail are cut. For example, cutouts 56a and 56b are cut under the receptacle 52g.

The light-emitting diodes 53a to 53h, which are electrically connected to the receptacles 52a to 52h, display the operational statuses of drives mated with these receptacles 52a to 52h.

Connectors 54 and 55 are disposed at an end portion of the wiring board 38a, forward in Y direction (left side in FIG. 7). Light-emitting diodes disposed on the front panel 40 are connected to these connectors 54 and 55, as described later.

Six holes 57 are drilled in a periphery of the wiring board 38a, at four corners and upper and lower middle locations. These holes 57 are provided for attaching the wiring board 38a to a drawer frame of the drawer 6a to be described later.

Figure 8:
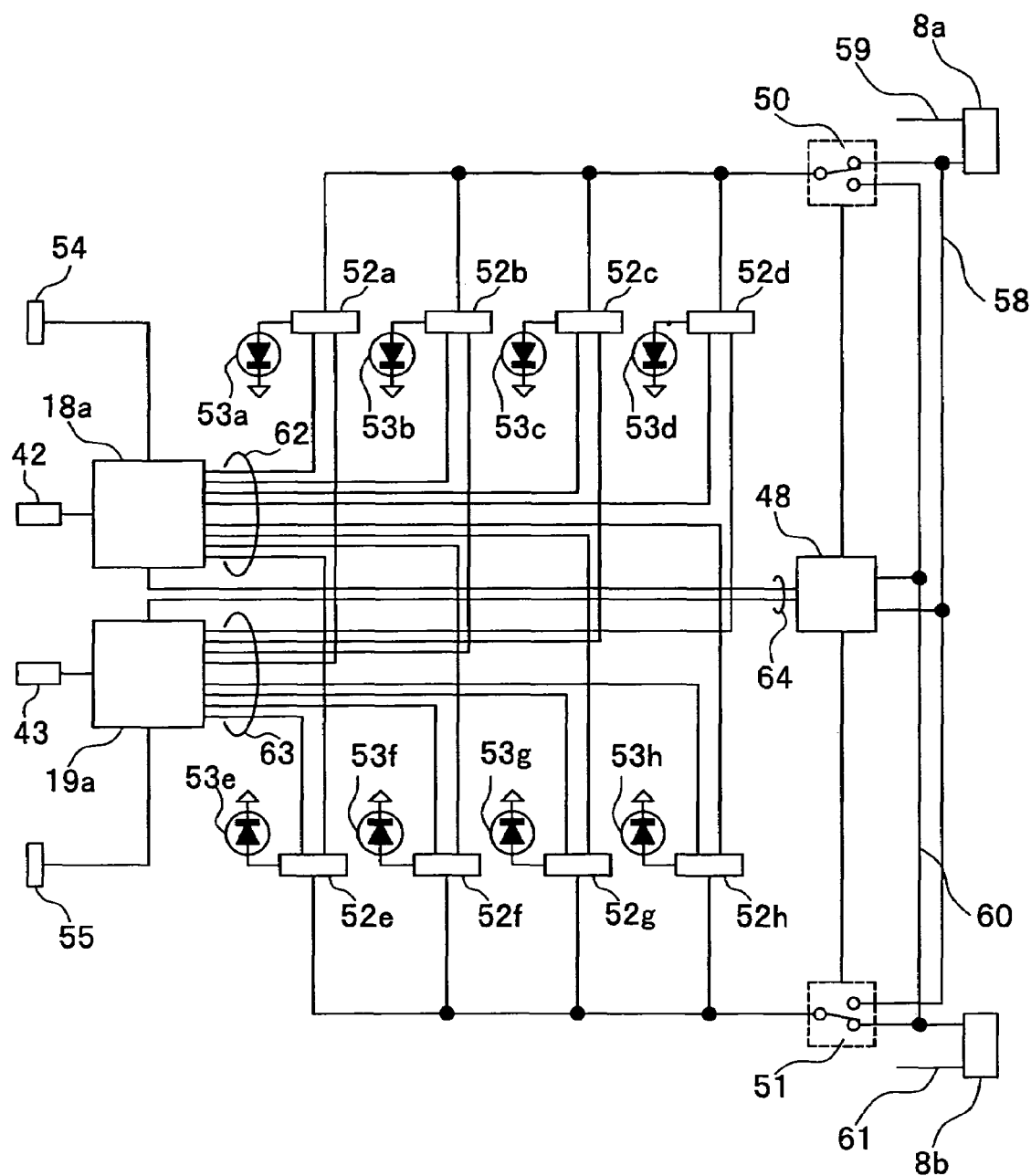
FIG. 8 is a circuit diagram showing a wiring board.

Next, description is given of wiring of parts mounted on the wiring board 38a with reference to FIG. 8. In the FIG. 8, description of wiring connection is limited to the side of a positive power supply, and is omitted for the side of a negative power supply. A channel is symbolically represented by a line even if it is physically made of a plurality of wires.

Power lines 58 and 59, power lines 60 and 61 and signal lines 62, 63 and 64 are major lines which are wired on the wiring board 38a.

The power lines 58 and 59 are connected to the connector 8a and the power lines 60 and 61 are connected to the connector 8b.

The power lines 58 and 60 connect the connectors 8a and 8b with the receptacles 52a to 52h via the switches 50 and 51, supplying electrical power for the receptacles 52a to 52h, which activates the drives.

The power lines 59 and 61 are responsible for supplying electrical power to parts except for the drives, such as the fan 39a (see FIG. 6) and the switches 18a and 19a. It should be necessary to add some explanation that mid portions of the power lines 59 and 61 are omitted in FIG. 8.

The power supply monitor 48, which is connected to the connectors 8a and 8b by the power lines 58 and 60, monitors voltages imposed through these power lines 58 and 60, thereby controlling the switches 50 and 51. In this way, even if a failure occurs in one of the power supplies 5a and 5b (see FIG. 1), which is connected to one of the connectors 8a and 8b, it is possible to connect a normal power supply, one of the power supplies 5a and 5b, to the drives. In this connection, FIG. 8 shows an exemplary case where both power supplies 50 and 51 are normal. In this case, the power supply 5b supplies electrical power to the receptacles 52a to 52d via the connector 8a, and the power supply 5a supplies electrical power to the receptacles 52e to 52h via the connector 8b. When a failure occurs in one of the power supplies 5a and 5b, one normal power supply of these power supplies 5a and 5b, will supply electrical power.

The signal line 62 connects the switch 18a and the receptacles 52a to 52h. The signal line 63 similarly connects the switch 19a and the receptacles 52a to 52h. The connectors 54 and 55 as well as the connection ports 42 and 43 are connected to the switches 18a and 19a, respectively. In this way, information displayed by the light-emitting diodes 53a to 53h, which indicates statuses of the drives, is sent to the switches 18a and 19a, and then sent to the connectors 54 and 55, which are connected to the switches 18a and 19a. Therefore, light-emitting diodes which are connected to the connectors 54 and 55 are able to display the same information as the light-emitting diodes 53a to 53h.

The signal line 64 connects the switches 18a and 19a to the power supply monitor 48. This connection allows the power supply monitor 48 to receive commands generated by the disk controller 3 via the connection ports 42 and 43, the switches 18a and 19a and the signal line 64. In this way, it may be alternatively possible that the power supply monitor 48 controls the switches 50 and 51 based on the commands generated by the disk controller 3 so as to switch the power supplies 5a and 5b.

Figure 9:
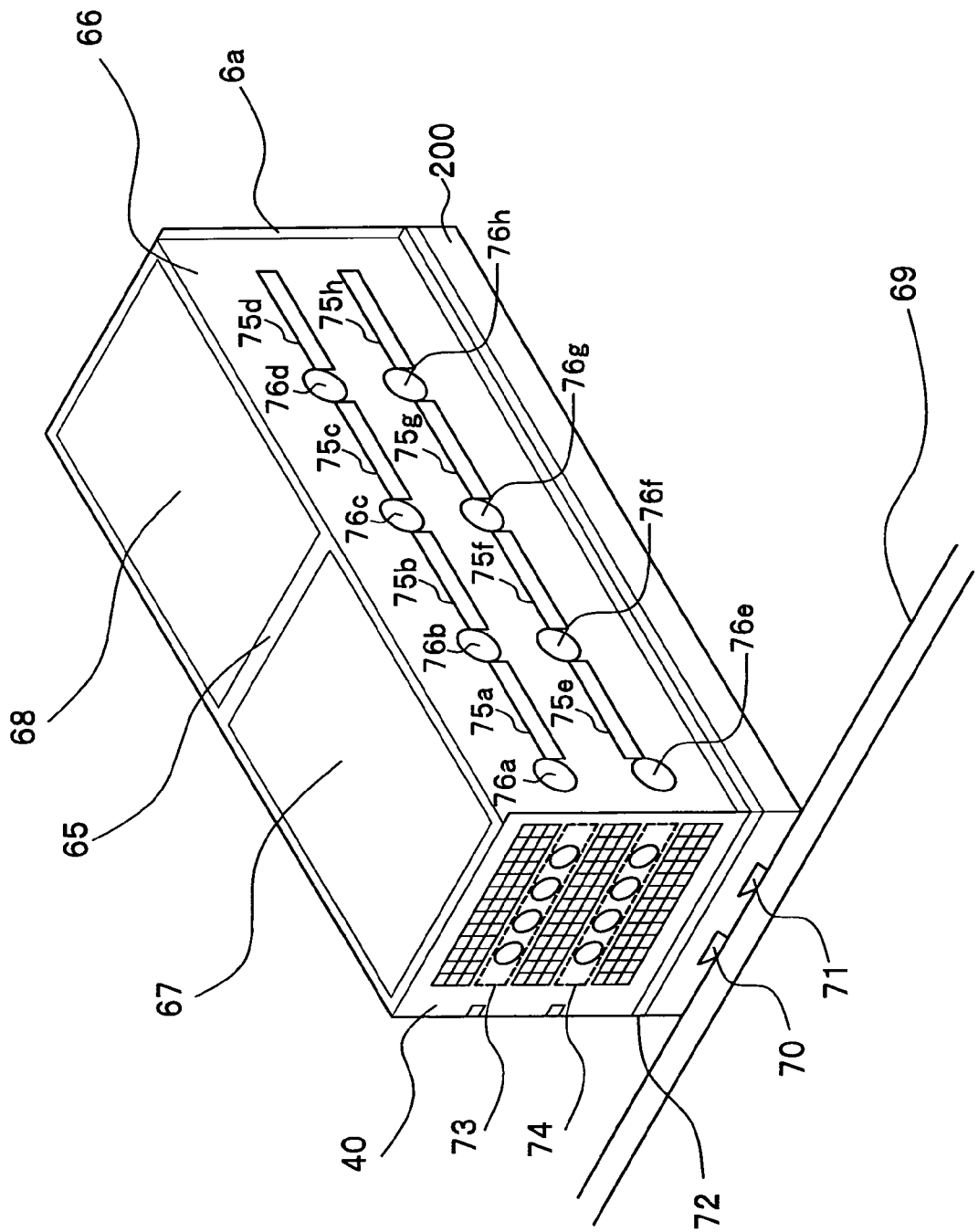
FIG. 9 is a perspective view showing a drawer of a disk array unit.

Description is given of the drawers 6a to 6d of the disk array unit 4 with reference to FIG. 9. Hereinafter description is exemplarily given of the drawer 6a.

When the drawer 6a is drawn out from the chassis 2, the drawer 6a is adapted to slide on rack rails 70 and 71 laid on a rack base 69 and to stop at a predetermined position. A rubber vibration isolator 72 is disposed on a drawer base 200 in a lower portion of the drawer 6a in order to prevent vibration while the drawer 6 is being drawn out.

As shown in FIG. 9, light-emitting diode arrays 73 and 74 are disposed on the front panel 40 of the drawer 6a. The light-emitting diode array 73, which has four light-emitting diodes lined up horizontally, displays the same information as the light-emitting diodes 53a to 53d lying on the wiring board 38a (see FIG. 7). Similarly, the light-emitting diode array 74, which has four light-emitting diodes lined up horizontally, displays the same information as the light-emitting diodes 53e to 53h lying on the wiring board 38a (see FIG. 7).

The drawer 6a has a drawer frame 65 to which a side panel 66 and top panels 67 and 68 are secured.

With the disk array 17a lying between them, the side panel (guide member) 66 is secured to a surface (right side in FIG. 9) of the drawer frame 65 which confronts the board surface of wiring board 38a (see FIG. 6).

The top panels (guide members) 67 and 68 are secured to a surface (top side in FIG. 9) of the drawer frame 65 which abuts on the board surface of wiring board 38a (see FIG. 6).

The side panel 66 and the top panels 67 and 68 allow air supplied by the fan 39a to be guided to the disk array 17a (see FIG. 6).

Drive windows 75a, 75b, 75c, 75d, 75e, 75f, 75g, and 75h, and light-emitting diode windows 76a, 76b, 76c, 76d, 76e, 76f, 76g and 76h are cut in the side panel 66.

The drive windows 75a to 75h are so positioned that they correspond to the eight drives belonging to the disk array 17a (see FIG. 6). As described later, the eight drives are inserted through the drive windows 75a to 75h and mated with the receptacles 52a to 52h (see FIG. 7) on the wiring board 38a.

The light-emitting diode windows 76a to 76h are positioned so as to correspond to the eight light-emitting diodes 53a to 53h on the wiring board 38a (see FIG. 7). Lenses are provided for the light-emitting windows 76a to 76h to increase visibility. In this connection, the light-emitting diodes 53a to 53h on the wiring board 38a (see FIG. 7) and the light-emitting diode windows 76a to 76h on the side panel 66 are spaced by the width of the disk array 17a (see FIG. 6). However, introduction of optical fibers makes it possible for light emitted by the light-emitting diodes 53a to 53h (see FIG. 7) to penetrate the light-emitting windows 76a to 76h.

Figure 10:
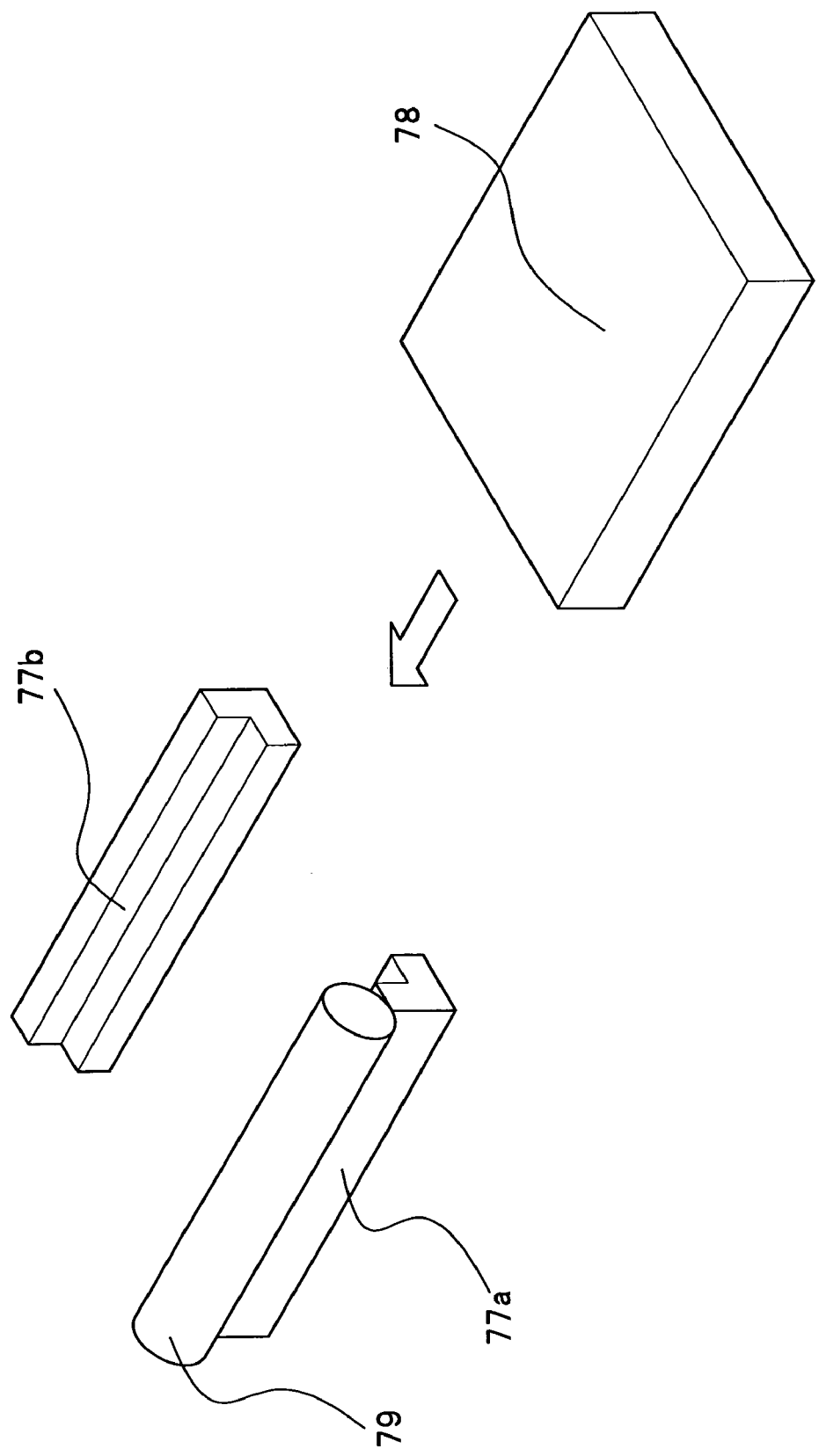
FIG. 10 is a schematic diagram illustrating installation of a drive.

Description is given of how a drive is installed in the drawer 6a with reference to FIG. 10. As shown in FIG. 10, drive rails 77a and 77b are secured to the drawer frame 65 (see FIG. 9) while first end portions (left side in FIG. 10) of the drive rails 77a and 77b are inserted into cutouts (for example the cutouts 56a and 56b) provided under the receptacles 52a to 52h at both sides of each receptacle on the wiring board 38a (see FIG. 7). At the same time, second end portions (right side in FIG. 10) are inserted into the drive windows 75a to 75h (see FIG. 9) in the side panel 66. In this way, if a drive 78 is inserted into the drive window 75a (see FIG. 9) for example, this drive 78 is guided by the drive rails 77a and 77b, thereby being mated with the receptacle 52a on the wiring board 38a (see FIG. 7).

An optical fiber 79 is laid on the drive rail 77a. This optical fiber 79 transmits light emitted by the light-emitting diodes 53a to 53h on the wiring board 38a (see FIG. 7) to the light-emitting diode windows 76a to 76h (see FIG. 9). In this connection, the optical fiber 79 has a sufficient numerical aperture so that light emitted by the light-emitting diodes 53a to 53h (see FIG. 7) penetrates the light-emitting diode windows 76a to 76h (see FIG. 9).

Figure 11:
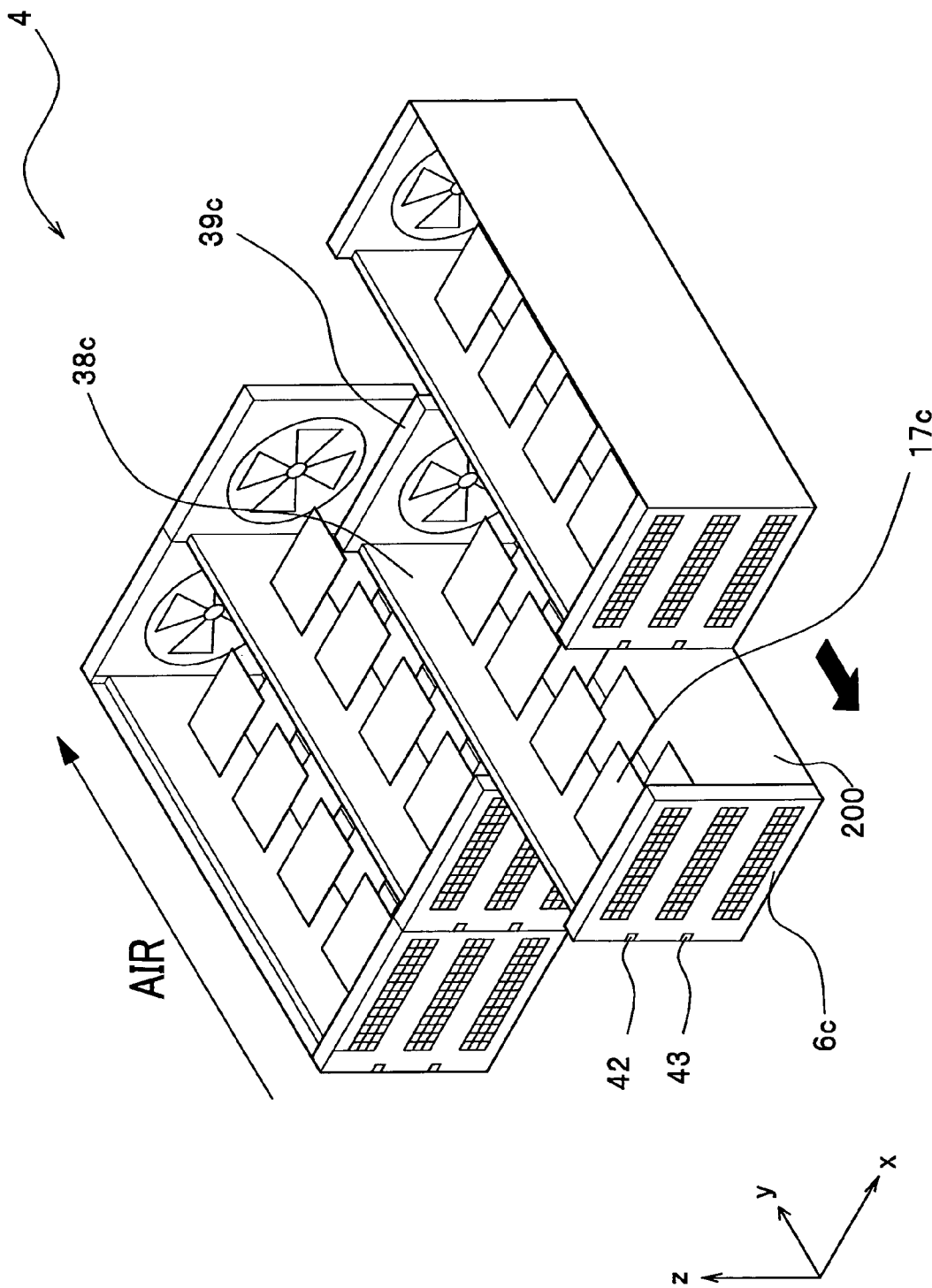
FIG. 11 is a perspective view showing the inside of a disk array unit when a drawer is drawn out.

Description is given of how the drawers 6a to 6d of the disk array unit 4 are drawn out from the chassis 2 in the disk device 1 according to the present embodiment with reference to FIG. 11. In FIG. 11, the drawer 6c is drawn out from the chassis 2 as an example. When a failure occurs in a disk belonging to the disk array 17c, for example, the drawer 6c is drawn out in order to replace a failed drive. The disk array 17c, the wiring board 38c and the fan 39c are simultaneously drawn out with the drawer 6c.

At this moment the channels 7e and 7f, which connect the connection ports 42 and 43 with the disk controller 3, maintain electrical connection alive. Also, the two power cables (see FIG. 2), which connect the connectors 8a and 8b (see FIG. 8) on the wiring board 38a with the power supplies 5a and 5b, keep electrical connection alive. Accordingly, electrical power is supplied to the disk array 17c, the fan 39d and the like. In this way, drives belonging to the disk array 17, which are normal and need not replaced, are able to continue to work regularly with cooling air provided by the fan 39d. Furthermore, this air cools electronic parts on the wiring board 38c in addition to the drives. Because the drawer 6c has the side panel 66 (see FIG. 9) on its right side, which is not described in FIG. 11, the top panels 67 and 68 (see FIG. 9) on its top and the drawer base 200 on its bottom as well as the wiring board 38c, it is possible to efficiently guide air supplied by the fan 39c to the drives.

The drawer 6c is able to display statuses of drives belonging to the disk array 17c by the light-emitting diode window 76a to 76h in the side panel 66 (see FIG. 9). In this connection, before the drawer 6c is drawn out from the chassis 2 (see FIG. 1), the disk device 1 is able to display statuses of drives belonging to the disk array 17c by the light-emitting diode arrays 73 and 74 (see FIG. 9) on the front panel 40.

Because a surface of rotation of each drive belonging to the disk array 17c is in a horizontal plane and the board surface of wiring board 38c is positioned vertically, it is possible to densely lay out the receptacles 52a to 52h (see FIG. 7) providing connection for each drive on the wiring board 38c in the drawer 6c. As a result, it is possible for the disk device 1 to densely package drives. Furthermore, the board surface of wiring board 38c of the drawer 6c is adapted to be in a vertical plane in parallel with YZ plane in the chassis 2. This may lead to a decrease in possible chance of short-circuit caused by dropping a foreign material in the drawer 6c while drawn out, compared with a drawer in which a board surface of a wiring board is in a horizontal plane.

In addition, RAID groups are established for the disk array unit 4 by making a combination of drives belonging to different drawers. In case disconnection occurs in the channel 7e or 7f (see FIG. 1) or the power cable (see FIG. 2) when the drawer 6c is drawn out, it is possible to use a redundant drive in the drawer 6a, for example. As a result, it may be possible to increase the reliability of the disk device 1.

While the invention has been described in detail and with reference to specific embodiments thereof, it will be apparent to one skilled in the art that various changes and modifications can be made therein without departing from the spirit and scope thereof. For example, it may be alternatively possible for a disk device to employ a drawer which is able to draw out two columns of drives at a time. Description will be given of variations below, which are called second to sixth embodiments.

b. Second Embodiment

Figure 12:
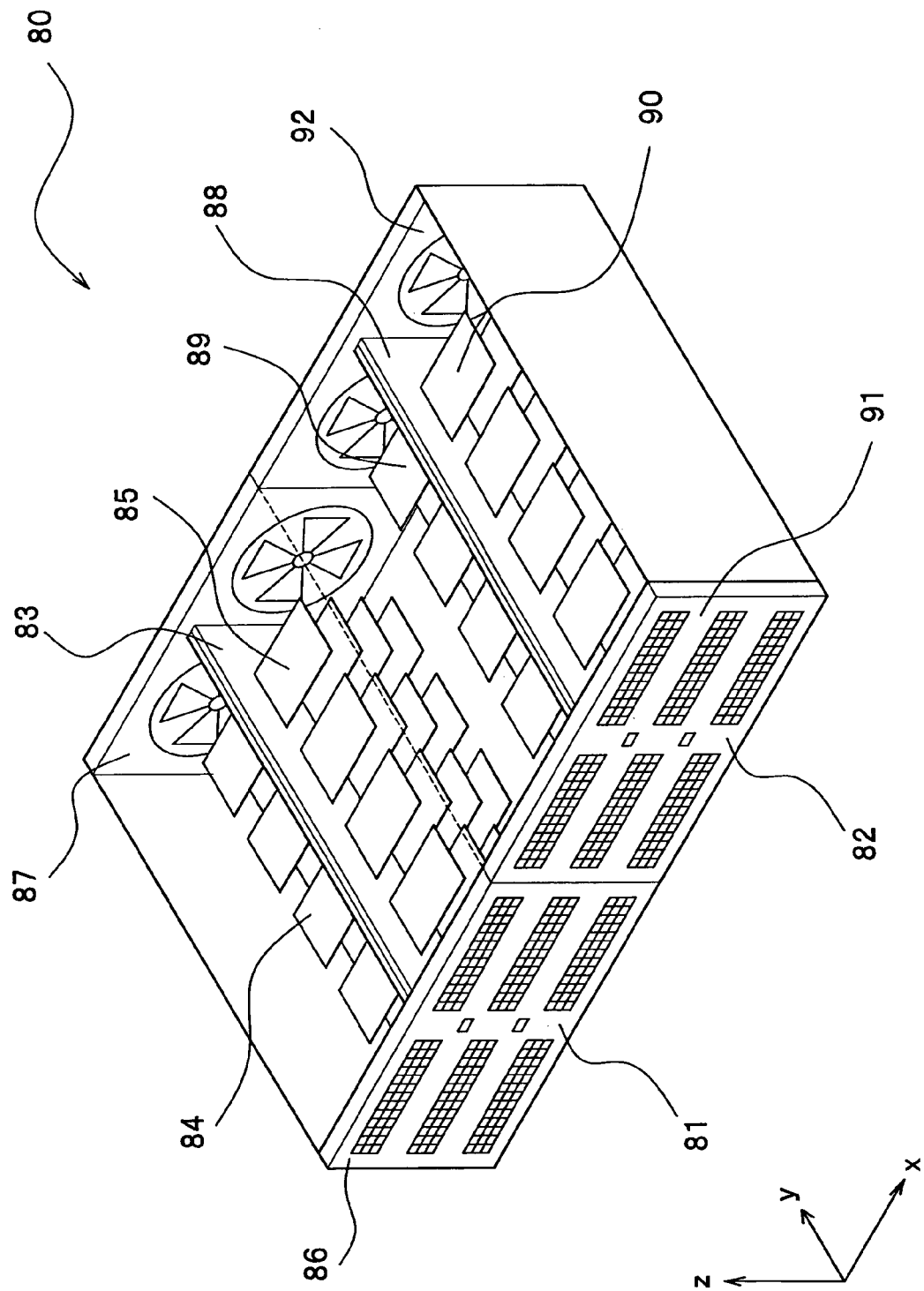
FIG. 12 is a perspective view showing the inside of a disk array unit of a disk device.
Figure 13:
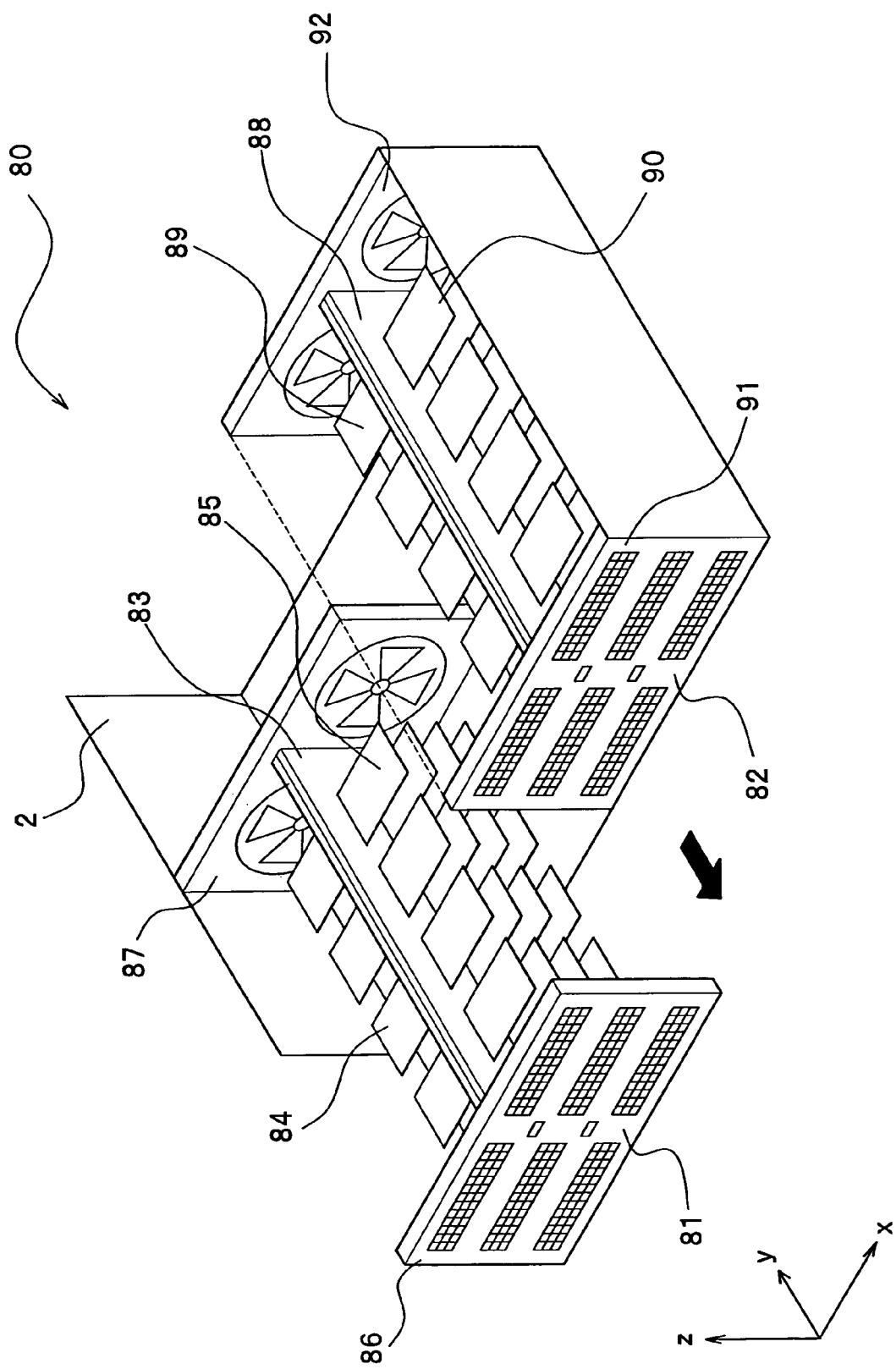
FIG. 13 is a perspective view showing a disk array unit in FIG. 12 when a drawer is drawn out.

Description is given of a disk device according to a second embodiment with reference to FIGS. 12 and 13. The disk device according to the second embodiment has the same structure as that of the first embodiment shown in FIG. 1 except for a disk array unit. Description will be limited to differences from the first embodiment.

As shown in FIG. 12, a disk array unit 80 has drawers 81 and 82. The drawer 81 serves as a combination of the drawers 6a and 6b shown in FIG. 6. Similarly, the drawer 82 serves as a combination of the drawers 6c and 6d.

The drawer 81 has a wiring board 83, disk arrays 84 and 85, a front panel 86 and a fan 87.

The wiring board 83 is like an integration of the wiring boards 38a and 38b shown in FIG. 7, which is obtained by bonding these two wiring boards 38a and 38b so that their connection surfaces for drive mutually look outwardly. It should be noted that one wiring board has a layout of parts which is plane-symmetric with the wiring board 38a shown in FIG. 7 relative to YZ-plane. In this connection, it may be possible to space these two wiring boards with a predetermined distance. The wiring board 83 is disposed in a middle of the drawer 81 in X direction.

The neighboring disk arrays 84 and 85 are attached to both right and left surfaces of the wiring board 83. In an example shown in FIG. 12, plural drives belonging to the disk arrays 84 and 85 are arranged in four rows in Y direction and four tiers in Z direction. In other words, the disk arrays 84 and 85 each have four columns of drives in Z direction, each column having four drives in Y direction. The disk array unit 80 as a whole has four columns of drives in X direction. In this connection, the disk arrays 84 and 85 correspond to the disk arrays 17a and 17b shown in FIG. 6, respectively.

The front panel 86 serves as an integration of two front panels 40, shown in FIG. 6, combined in X direction. Connection ports for connecting two disk arrays 84 and 85 to a disk controller 3 are provided on the front panel 86.

The fan 87 is like a combination of the fans 39a and 39b shown in FIG. 6. The fan 87 has connectors (not shown) for connecting two disk arrays 84 and 85 to power supplies 5a and 5b.

The drawer 82 has a wiring board 88, disk arrays 89 and 90, a front panel 91 and a fan 92. As the wiring board 88, the disk arrays 89 and 90, the front panel 91 and the fan 92 are the same as the wiring board 83, the disk arrays 84 and 85, the front panel 86 and the fan 87, respectively, description is omitted.

As shown in FIG. 13, the drawer 81 is drawn out from a chassis 2. In the drawer 81, the disk arrays 84 and 85 are disposed on both sides of the wiring board 83. Accordingly, if only the drawer 81 is drawn out from the chassis 2, it is possible to replace drives which belong to both the disk arrays 84 and 85. Even if failure occurs in drives belonging to both disk arrays 84 and 85, it is possible to carry out replacement by drawing out a drawer from the chassis 2 only once.

The second embodiment, which allows drawing out two disk arrays in X direction in the chassis 2 with a drawer at a time, is able to decrease the volume of drawers and drawer frames compared with a disk device having drawers each including only one disk array. As a result, the disk device according to the second embodiment is able to increase packaging density.

c. Third Embodiment

Figure 14:
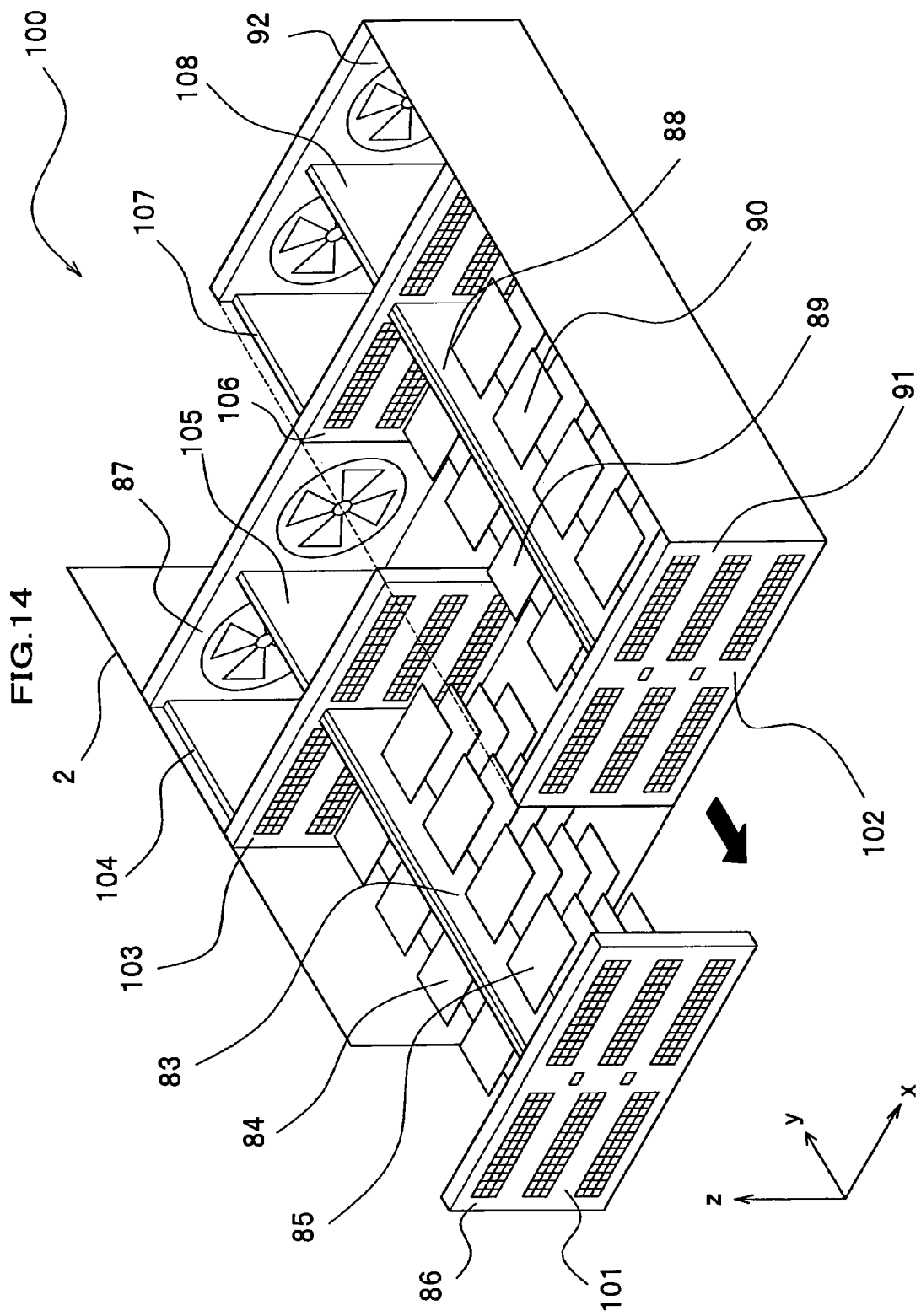
FIG. 14 is a perspective view showing the inside of a disk array unit of a disk device.

Description is given of a disk device according to a third embodiment with reference to FIG. 14. The disk device according to the third embodiment has the same structure as that of the second embodiment except that a disk array unit has power supplies. Description will be limited to differences from the second embodiment.

As shown in FIG. 14, a disk array unit 100 has drawers 101 and 102. In FIG. 14 the drawer 101 is drawn out from a chassis 2 as an example. In addition to the members of the drawer 81 shown in FIG. 13, the drawer 101 has an intermediate panel 103 and power supplies 104 and 105.

The intermediate panel 103, which has the same structure as a front panel 86, for example, is disposed at a position where the intermediate panel 103 confronts the front panel 86 with a wiring board 83 lying between them. The intermediate panel 103 has plural connection ports, through which a fan 87 and the power supplies 104 and 105 are connected to the wiring board 83.

The power supplies 104 and 105 are disposed behind the intermediate panel 103 at two positions spaced in X direction, extending in Y direction. These power supplies 104 and 105 are counterparts of the power supplies 5a and 5b shown in FIG. 1. The fan 87, which is disposed next to the power supplies 104 and 105 in Y direction, cools not only the disk arrays 84 and 85 but also the power supplies 104 and 105.

The drawer 102 has an intermediate panel 106 and power supplies 107 and 108 in addition to the members of the drawer 82 shown in FIG. 13. As the intermediate panel 106 and the power supplies 107 and 108 are the same as the intermediate panel 103 and the power supplies 104 and 105, respectively, description associated with these components is not repeated.

Because a disk device 1 according to the third embodiment has the disk array unit 100 equipped with the power supplies 104, 105, 107 and 108, it is not necessary to obtain a space for installing power supplies in other tiers than that of the disk array unit 100 in a chassis 2. This leads to a reduction in volume of the chassis 2 in terms of its height in Z direction. As a result, the volume of a disk device as a whole can be decreased, which contributes to an increase in packaging density. Furthermore, it is possible to reduce the number of parts by sharing a fan so as to cool both power supply and drive.

d. Fourth Embodiment

Figure 15:
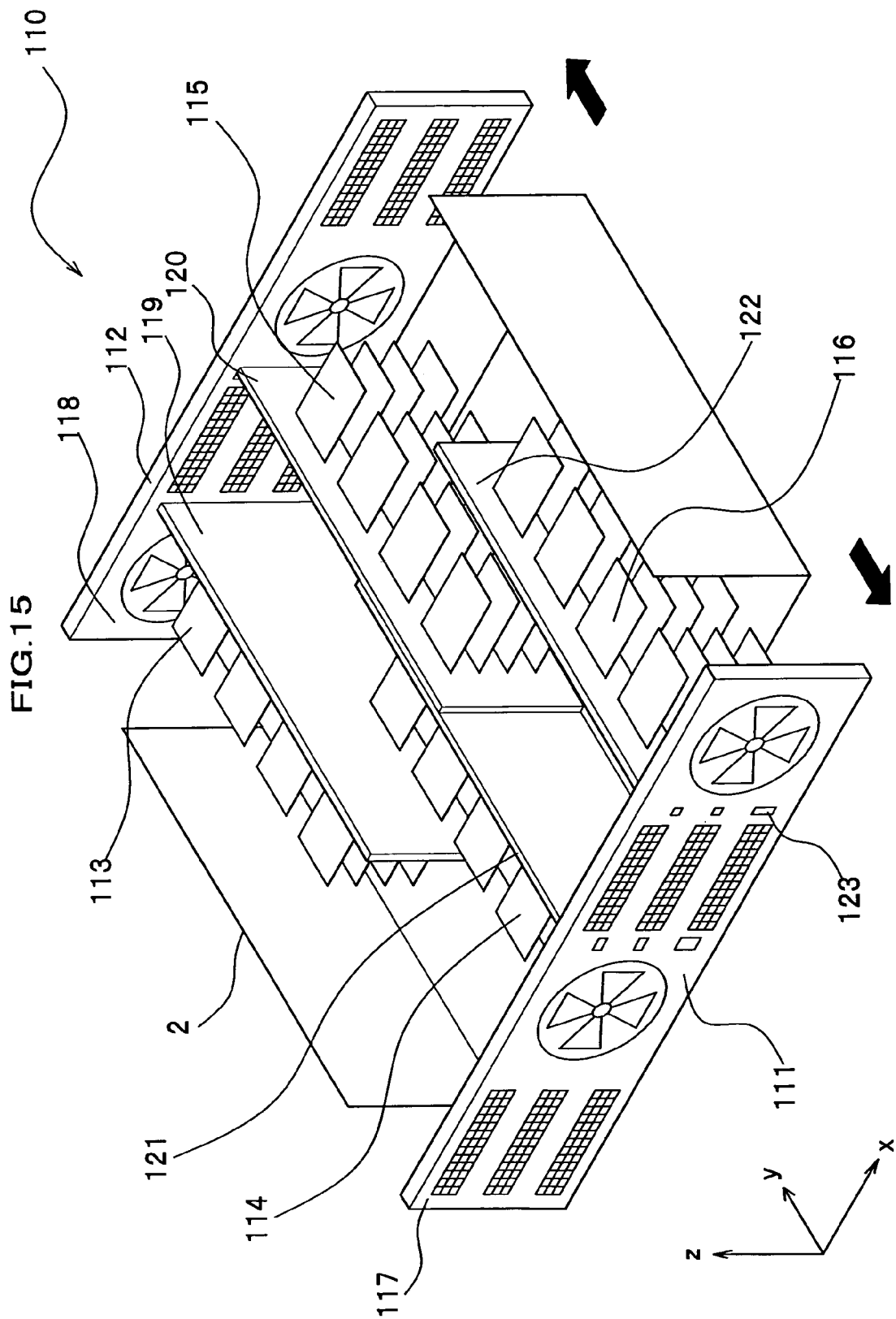
FIG. 15 is a perspective view showing the inside of a disk array unit of a disk device.

Description is given of a disk device according to a fourth embodiment with reference to FIG. 15. The disk device according to the fourth embodiment has the same structure as that of the first embodiment shown in FIG. 1 except for the structure of a disk array unit. Description will be limited to differences from the first embodiment.

As shown in FIG. 15, a disk array unit 110 has drawers 111 and 112. The drawer 111 serves as the drawers 6b and 6d shown in FIG. 6. Similarly, the drawer 112 serves as the drawers 6a and 6c shown in FIG. 6. In the disk array unit 110, the drawer 111 is adapted to be drawn out forwardly from the chassis 2, and in contrast, the drawer 112 is adapted to be drawn out backwardly from the chassis 2. However, a disk array 113, which is a counterpart of the disk array 17a shown in FIG. 6, belongs to the drawer 112, and a disk array 114, a counterpart of the disk array 17b, on the other hand, belongs to the drawer 111. Similarly, a disk array 115, which is a counterpart of the drawer 17c shown in FIG. 6, belongs to the drawer 112, and a disk array 116, a counterpart of the disk array 17d shown in FIG. 6, belongs to the drawer 111.

The drawers 111 and 112 have front panels 117 and 118, respectively. The front panel 117 is compared to a panel having two front panels 40 and two fans 39a of the disk array unit 4 shown in FIG. 6, which are alternately arranged in X direction as shown in FIG. 15. The front panel 118 is similar to the front panel 117. In this way, one of the front panels 117 and 118 serves as a rear panel.

The disk arrays 113 and 115 are attached to two wiring boards 119 and 120, respectively, which abut on the front panel 118 and are spaced each other with a predetermined distance. Similarly, the disk arrays 114 and 116 are attached to two wiring boards 121 and 122, respectively, which abut on the front panel 117 and are spaced each other with a predetermined distance. A pair of the wiring boards 119 and 120 is disposed so that their connection surfaces for drives look opposite directions. So is a pair of the wiring boards 121 and 122. The distance between the wiring boards 119 and 120 and that between the wiring boards 121 and 122 are adapted to be the same, for example. It will not be less than a length including the width of disk array 114 and the thickness of wiring board 121 or a length including the width of disk array 115 and the thickness of wiring board 120.

As the front panel 118 is not drawn out when only the drawer 111 is drawn out from the chassis 2, connectors 123 for a power supply are provided on the front panel 117 (for wiring boards 121 and 122). Similarly, connectors (not shown) are provided on the front panel 118 (for wiring boards 119 and 120).

When the drawers 111 and 112 are stored in the chassis 2, the disk array unit 110 described above is compared to a unit, in which the drawers 6b and 6d of the disk array unit 4 shown in FIG. 6 are reversed in Y direction. As a direction of air for cooling drives is adjustable for each drawer, it is possible to select the direction according to conditions of air conditioning under which a disk device is used.

The disk array unit 110 according to the fourth embodiment allows replacement of drives belonging to the disk arrays 113 to 116 by drawing out the drawers 111 and 112 oppositely in Y direction. The drawers 111 and 112, each of which includes two disk arrays spaced with a predetermined distance in X direction, have an increased foot print on the rack base 69 (see FIG. 9), thereby decreasing induced vibration while the drawer 111 and 112 are being drawn out.

e. Fifth Embodiment

Figure 16:
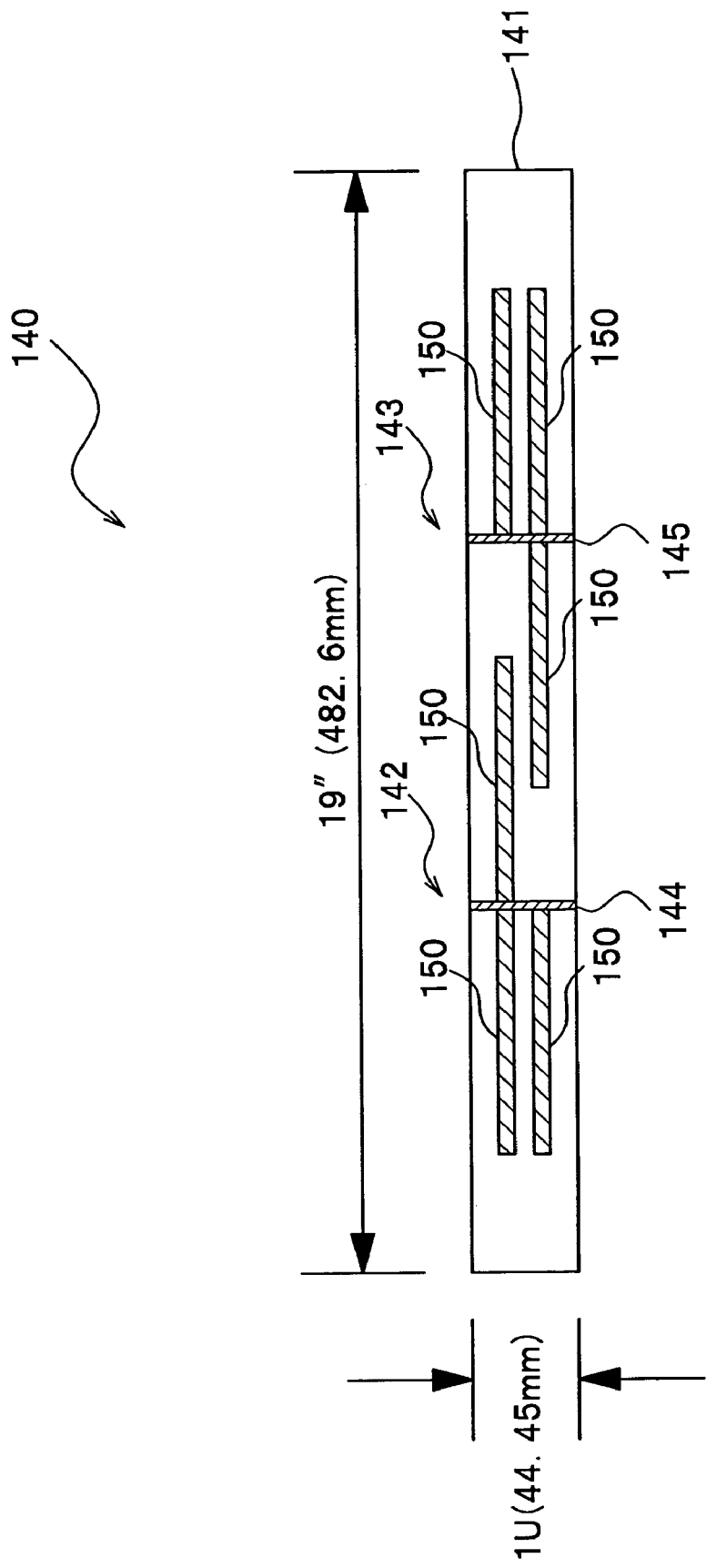
FIG. 16 is a sectional view showing a disk array unit of a disk device.
Figure 17:
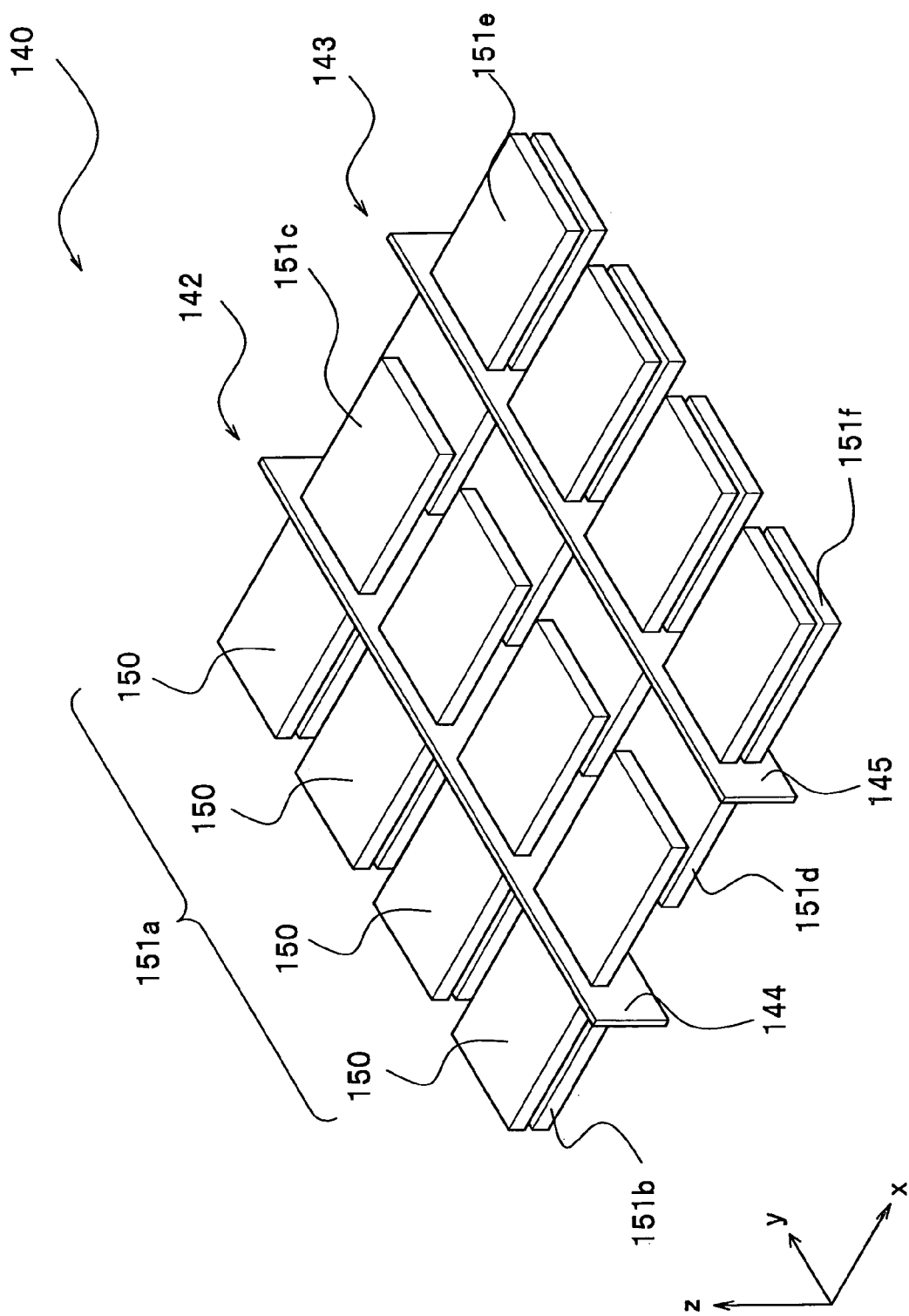
FIG. 17 is a perspective view showing a disk array unit of a disk device.
Figure 18:
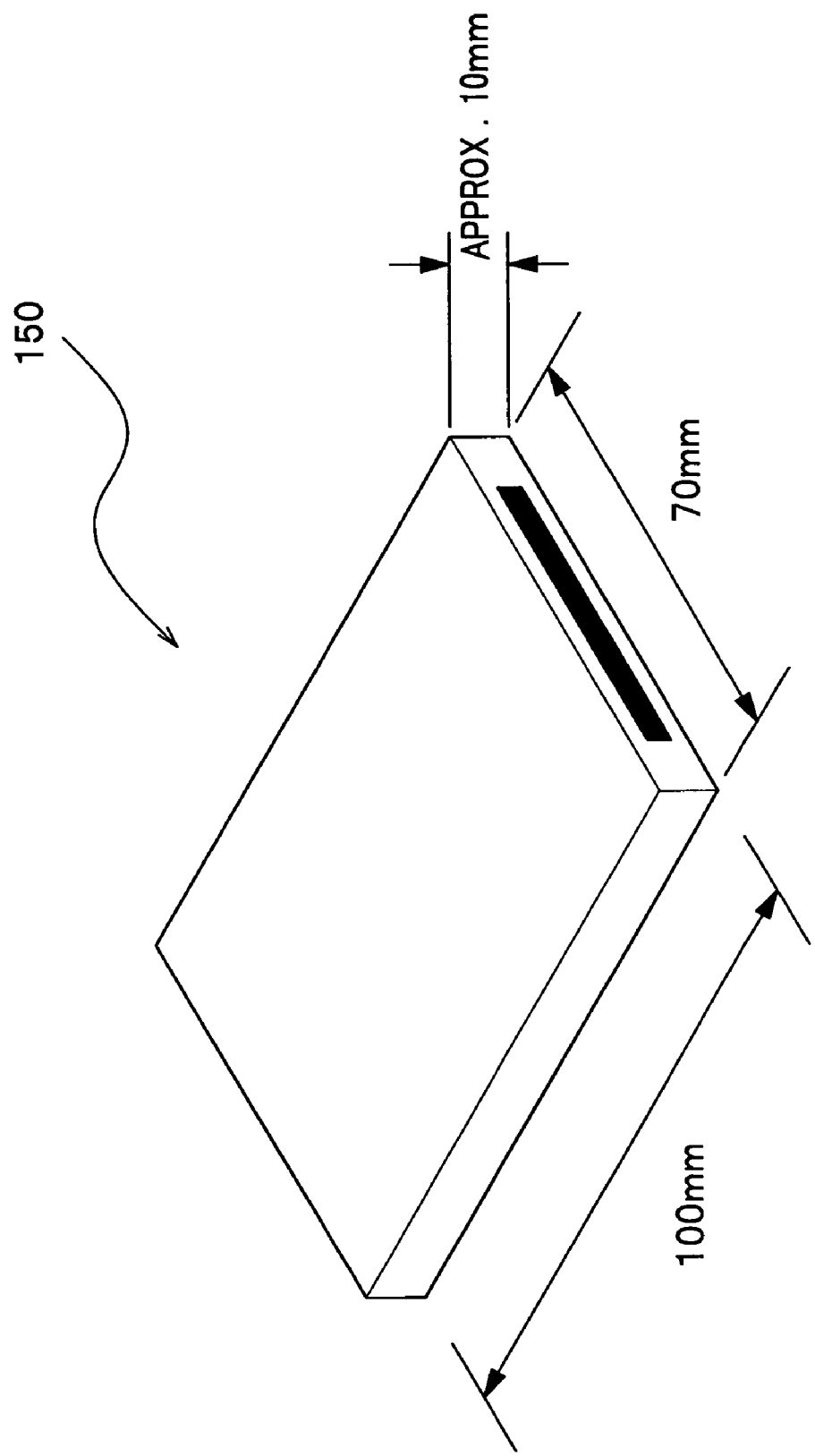
FIG. 18 is a perspective view showing a 2.5 inch drive.

Description is given of a disk device according to a fifth embodiment with reference to FIGS. 16 to 18. The disk device according to the fifth embodiment has the same structure as that of the second embodiment except for an arrangement of drives belonging to a disk array.

As shown in FIG. 16, a disk array unit 140 has a chassis 141 and drawers 142 and 143.

The chassis 141 is adapted to a 19 inch rack, for example, which has a height of 1 U (1 unit means 44.45 mm) and a width (internal dimension) of 482.6 mm.

The drawer 142 has a wiring board 144, to which twelve drives 150 (see FIG. 17) are attached.

Similarly, the drawer 143 has a wiring board 145, to which twelve drives 150 (see FIG. 17) are attached.

Each of the wiring boards 144 and 145 has connection surfaces for drive on its both surfaces.

A drive 150 is a 2.5 inch drive, for example, which has a length of 100 mm, a width of 70 mm having a connection surface for a receptacle and an approximate thickness of 10 mm, as shown in FIG. 18.

As shown in FIG. 17, the drawer 142 has columns of drives 151a and 151b on a left side of the wiring board 144, and a column of drives 151c on a right side of the wiring board 144, each of the columns of drives 151a, 151b and 151c having four drives 150. The column of drives 151b lies under the column of drives 151a. The column of drives 151c is positioned the same height as the column of drives 151a.

Similarly, the drawer 143 has a column of drives 151d on a left side of the wiring board 145, and columns of drives 151e and 151f on a right side of the wiring board 145. The columns of drives 151d and 151f are positioned the same height as the column of drives 151b. The column of drives 151e is positioned the same height as the column of drives 151a.

The column of drives 151d belonging to the drawer 143 lies under the column of drives 151c belonging to the drawer 142. Taking into account this arrangement, it may be possible to describe that the disk array unit 140 has columns of drives consisting of three columns and two tiers as a whole if the columns of drives 151c and 151d are assumed to be a column of drives consisting of one column and two tiers. Alternatively, it may also be possible to describe that the disk array unit 140 has four columns of drives as a whole if the columns of drives 151c and 151d are separately counted. In this way, the drive device according to the fifth embodiment enables packaging of three or four columns of drives in X direction in a 19 inch rack. In addition as shown in FIG. 16, the arrangement described above produces a space at both sides of the rack 141, which provides a storage space for extra length of a power cable and the like.

f. Sixth Embodiment

Figure 19:
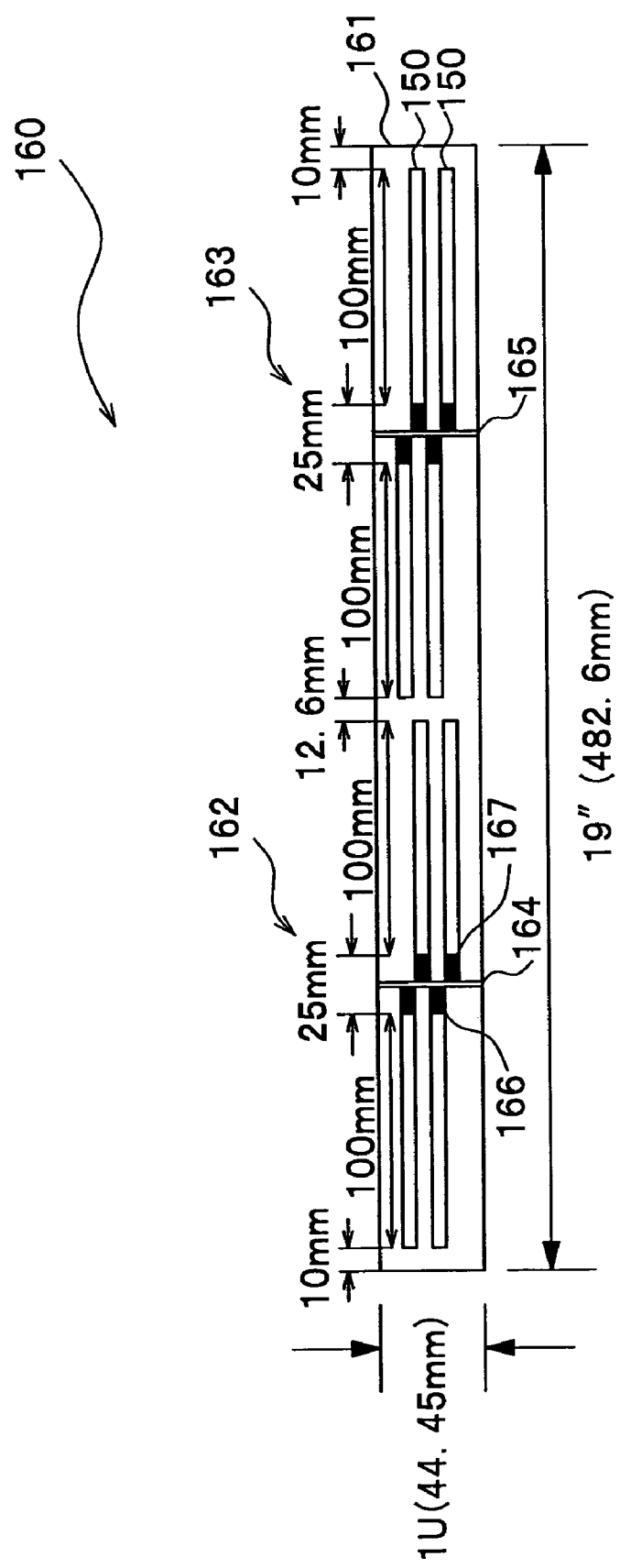
FIG. 19 is a sectional view showing a disk array unit of a disk device.
Figure 20:
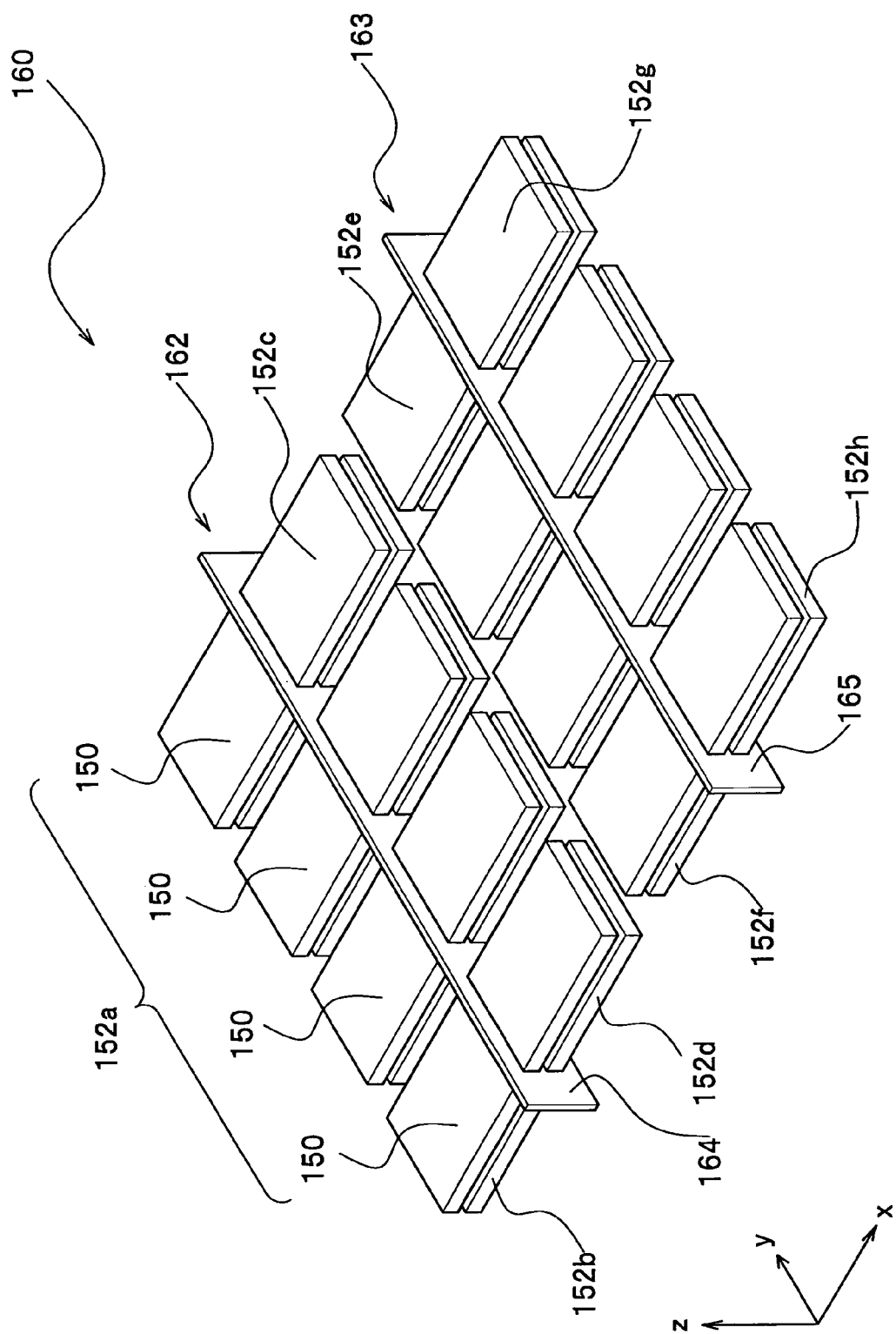
FIG. 20 is a perspective view showing a disk array unit of a disk device.

Description is given of a disk device according to a sixth embodiment with reference to FIGS. 19 and 20. The disk device according to the sixth embodiment has the same structure as that of the fifth embodiment except for an arrangement of drives belonging to a disk array.

As shown in FIG. 19, a disk array unit 160 has a chassis 161 and drawers 162 and 163.

The chassis 161 is adapted to a 19 inch rack, for example, which has a height of 1 U (1 unit means 44.45 mm).

The drawer 162 has a wiring board 164, to which sixteen drives 150 (see FIG. 20) are attached.

Similarly, the drawer 163 has a wiring board 165, to which sixteen drives 150 (see FIG. 20) are attached.

The wiring board 164 has connection surfaces for drive on its both surfaces. A position of receptacle on a first connection surface for drive differs from a position on a second connection surface for drive. As shown in FIG. 19, for example, a position of a receptacle 166, which lies in a lower tier and on a left side of the wiring board 164, is several millimeters higher than that of a receptacle 167, which lies in a lower tier and on a right side of the same wiring board 164. Receptacles lying in upper tiers are similarly arranged as those in the lower tiers. In addition, the wiring board 165 has the same structure as that of the wiring board 164.

In this connection, a drive 150 is a 2.5 inch drive, for example.

As shown in FIG. 20, the drawer 162 has columns of drives 152a and 152b on a left side of the wiring board 164, and columns of drives 152c and 152d on a right side of the same wiring board 164, each of the columns of drives 152a, 152b, 152c and 152d having four drives. Similarly, the drawer 163 has columns of drives 152e and 152f on a left side of the wiring board 165, and columns of drives 152g and 152h on a right side of the same wiring board 165.

As shown in FIG. 19 according to the sixth embodiment, it is possible to arrange four columns of 2.5 inch drives in X direction in the 19 inch rack sized chassis 161 if the following packaging of drives 150 is assumed. Namely, there is a space having a width of 10 mm at both end portions of a chassis 161, a gap between the drawers 162 and 163 is 12.6 mm, and the wiring boards 164 and 165 each has a width of 25 mm including receptacles. If a drawer is provided for each column of drives (four drawers are provided), it will be difficult to install four columns of drives in a 19 inch rack sized chassis because a gap between drawers and a thickness of a wiring board are required to be added.

The sixth embodiment, which introduces nonaligned positions for the receptacles 166 and 167 lying on both sides of the wiring board 164, prevents mutual interference of pins between these receptacles 166 and 167. In this way, the wiring board 164 does not need to have so large thickness as that required by the length of a pin. As a result, it is possible to reduce the thickness of wiring board 164.

Foreign priority document, JP 2005-045365 filed on Feb. 22, 2005, is hereby incorporated by reference.

What is claimed is:

1. A disk device comprising:
a chassis;
disk drives arranged in height and depth directions in the chassis;
wiring boards for the disk drives; and
blowers for cooling the disk drives;
wherein the disk drives are spaced each other with a predetermined distance and attached to the wiring boards so that a disk surface of rotation of each disk drive is perpendicular to a board surface of a wiring board, and wherein the disk device further comprises:
drawer units which provide simultaneous extraction of the disk drives, the wiring boards and the blowers from the chassis;
face-panel light emitting diodes (LEDs) provided in at least one-to-one correspondence to the disk drives, and viewable on a drawer unit face panel of a drawer unit while the drawer unit is fully-inserted into the chassis, each face-panel LED providing operational information with respect to the face-panel LED's corresponding disk drive; and,
side-panel LEDs provided in at least one-to-one correspondence to the disk drives, and viewable on a drawer unit side panel of a drawer unit while the drawer unit is extracted outward from the chassis, each side-panel LED providing operational information with respect to the side-panel LED's corresponding disk drive.

2. A disk device according to claim 1, wherein each drawer unit further has guide members which are in one of positions of abutting on the board surface of the wiring board and confronting this board surface across the disk drives so that a direction of air supplied by a blower is directed to the disk drives.

3. A disk device according to claim 1, wherein a data redundant configuration is established by making a combination of a set of disk drives belonging to a drawer unit and another set of disk drives belonging to another drawer unit.

4. A disk device according to claim 1, wherein each drawer unit comprising a power connection arrangement adapted to electrically couple the drawer unit to a power supply of the chassis, to supply uninterrupted power to the drawer unit while the drawer unit is extracted outward from the chassis.

5. A disk device comprising:
a chassis;
columns of drives each having disk drives which are arranged in a depth direction in the chassis; and
wiring boards for the columns of disk drives;
wherein the columns of drives are spaced each other in height and width directions in the chassis with predetermined distances,
wherein each wiring board is disposed between two columns of drives neighboring each other in the width direction so that a disk surface of rotation of each disk drive is perpendicular to a board surface of a wiring board, and both surfaces of the wiring board have each a connection surface for disk drive, and
wherein the disk device further comprises:
drawer units each providing simultaneous extraction of the wiring board and at least the two columns of drives from the chassis;
face-panel light emitting diodes (LEDs) provided in at least one-to-one correspondence to the disk drives, and viewable on a drawer unit face panel of a drawer unit while the drawer unit is fully-inserted into the chassis, each face-panel LED providing operational information with respect to the face panel LED's corresponding disk drive; and,
side-panel LEDs provided in at least one-to-one correspondence to the disk drives, and viewable on a drawer unit side panel of a drawer unit while the drawer unit is extracted outward from the chassis, each side-panel LED providing operational information with respect to the side-panel LED's corresponding disk drive.

6. A disk device according to claim 5, wherein the disk drives belonging to the columns of drives comprise 2.5 inch disk drives, the chassis comprises a 19 inch rack and wherein the columns of drives are arranged in one of three and four lines in the width direction in the chassis.

7. A disk device according to claim 5, wherein each drawer unit comprising a power connection arrangement adapted to electrically couple the drawer unit to a power supply of the chassis, to supply uninterrupted power to the drawer unit while the drawer unit is extracted outward from the chassis.

8. A disk device comprising:
a chassis;
columns of drives each having disk drives which are arranged in a depth direction in the chassis;
wiring boards for the columns of disk drives; and
blowers for cooling the disk drives;
wherein the columns of drives are spaced each other in height and width directions in the chassis with predetermined distances,
wherein each wiring board is disposed between two columns of drives neighboring each other in the width direction so that a disk surface of rotation of each disk drive is perpendicular to a board surface of a wiring board, and both surfaces of the wiring board have each a connection surface for disk drive, and
wherein the disk device further comprises:
drawer units each providing simultaneous extraction of the wiring board, at least the two columns of drives and the blowers from the chassis;
face-panel light emitting diodes (LEDs) provided in at least one-to-one correspondence to the disk drives, and viewable on a drawer unit face panel of a drawer unit while the drawer unit is fully-inserted into the chassis, each face-panel LED providing operational information with respect to the face panel LED's corresponding disk drive; and,
side-panel LEDs provided in at least one-to-one correspondence to the disk drives, and viewable on a drawer unit side panel of a drawer unit while the drawer unit is extracted outward from the chassis, each side-panel LED providing operational information with respect to the side-panel LED's corresponding disk drive.

9. A disk device according to claim 8, wherein each drawer unit has guide members surrounding the columns of drives so that a direction of air supplied by the blowers is directed to the disk drives.

10. A disk device according to claim 8, wherein each drawer unit has a power supply which supplies electric power for the columns of drives and electronic parts mounted on the wiring board.

11. A disk device according to claim 10, further comprising one or more power supplies and a switching control unit, wherein the switching control unit selects a normal power supply so as to supply electric power for the columns of drives and the electronic parts when one of the power supplies fails.

12. A disk device according to claim 8, wherein a data redundant configuration is established by making a combination of drives belonging to a drawer unit and drives belonging to another drawer unit.

13. A disk device according to claim 8, wherein the disk drives belonging to the columns of drives comprise 2.5 inch disk drives, the chassis comprises a 19 inch rack and wherein the columns of drives are arranged in one of three and four lines in the width direction in the chassis.

14. A disk device according to claim 8, wherein each drawer unit comprising a power connection arrangement adapted to electrically couple the drawer unit to a power supply of the chassis, to supply uninterrupted power to the drawer unit while the drawer unit is extracted outward from the chassis.

15. A disk device comprising:
a chassis;
columns of drives each having disk drives which are arranged in a depth direction in the chassis;
wiring boards for the columns of disk drives; and
blowers for cooling the disk drives;
wherein the columns of drives are spaced each other in height and width directions in the chassis with predetermined distances and attached to the wiring boards so that a disk surface of rotation of each disk drive is perpendicular to a board surface of a wiring board,
wherein two wiring boards are arranged with a predetermined distance spaced in a width direction, the two wiring boards having connection surfaces for disk drive which face opposite directions,
wherein the disk device comprises drawer units each providing simultaneous extraction of at least two columns of drives attached to the two wiring boards and the blowers from the chassis,
wherein the predetermined distance for the two wiring boards is greater than a summation of a width of a column of drives and a thickness of the wiring board, and
wherein a pair of drawer units is adapted to be drawn out mutually oppositely in the depth direction in the chassis.

16. A disk device according to claim 15, wherein the disk device further comprises:
face-panel light emitting diodes (LEDs) provided in at least one-to-one correspondence to the disk drives, and viewable on a drawer unit face panel of a drawer unit while the drawer unit is fully-inserted into the chassis, each face-panel LED providing operational information with respect to the face-panel LED's corresponding disk drive; and,
side-panel LEDs provided in at least one-to-one correspondence to the disk drives, and viewable on a drawer unit side panel of a drawer unit while the drawer unit is extracted outward from the chassis, each side-panel LED providing operational information with respect to the side-panel LED's corresponding disk drive.

17. A disk device according to claim 16, wherein each drawer unit comprising a power connection arrangement adapted to electrically couple the drawer unit to a power supply of the chassis, to supply uninterrupted power to the drawer unit while the drawer unit is extracted outward from the chassis.

18. A disk device comprising:
disk drives;
wiring boards which activate the disk drives;
blowers for cooling the disk drives;
plural drawer units each providing simultaneous extraction of the disk drives, the wiring boards and the blowers; and
a chassis in which the drawer units are stored,
wherein the disk drives are arranged on both board surfaces of a wiring board in plural rows with a predetermined distance spaced in a depth direction and in plural tiers with a predetermined distance spaced in a height direction in the chassis, wherein the wiring board is arranged so that a board surface of the wiring board is perpendicular to a disk surface of rotation of each disk drive, wherein a logical group for data redundant configuration is established by a combination of the disk drives in the drawer units, and wherein the drawer units are adapted to be drawn out in the depth direction from the chassis;

wherein the disk device further comprises:

face-panel light emitting diodes (LEDs) provided in at least one-to-one correspondence to the disk drives, and viewable on a drawer unit face panel of a drawer unit while the drawer unit is fully-inserted into the chassis, each face-panel LED providing operational information with respect to the face panel LED's corresponding disk drive; and, side-panel LEDs provided in at least one-to-one correspondence to the disk drives, and viewable on a drawer unit side panel of a drawer unit while the drawer unit is extracted outward from the chassis, each side-panel LED providing operational information with respect to the side-panel LED's corresponding disk drive.

19. A disk device according to claim 18, wherein each drawer unit comprising a power connection arrangement adapted to electrically couple the drawer unit to a power supply of the chassis, to supply uninterrupted power to the drawer unit while the drawer unit is extracted outward from the chassis.

* * * * *